(12) United States Patent
Ostvik et al.

(10) Patent No.: US 11,124,725 B2
(45) Date of Patent: *Sep. 21, 2021

(54) PROCESS VESSEL FOR FORMING FUEL COMPOSITIONS AND RELATED SYSTEMS AND METHODS

(71) Applicant: Ecogensus LLC, Hartford, CT (US)

(72) Inventors: Bjornulf Ostvik, Hartford, CT (US); Michael D. Lukas, Hartford, CT (US)

(73) Assignee: Ecogensus LLC, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,292

(22) Filed: Apr. 13, 2020

(65) Prior Publication Data

US 2021/0032555 A1    Feb. 4, 2021

Related U.S. Application Data

(63) Continuation of application No. 16/374,444, filed on Apr. 3, 2019, now Pat. No. 10,618,025.

(Continued)

(51) Int. Cl.
*B01J 19/00* (2006.01)
*C10L 5/46* (2006.01)
(Continued)

(52) U.S. Cl.
CPC . *C10L 5/46* (2013.01); *B01J 8/10* (2013.01); *B01J 19/0066* (2013.01); *B01J 19/20* (2013.01);
(Continued)

(58) Field of Classification Search
CPC .... C10L 5/46; C10L 5/48; C10L 9/083; C10L 5/06; C10L 5/445; C10L 2290/565;
(Continued)

(56) References Cited

U.S. PATENT DOCUMENTS

| 2,760,936 A | 8/1956 | Baker |
| 3,742,613 A | 7/1973 | Von Gimborn |

(Continued)

FOREIGN PATENT DOCUMENTS

| CN | 1810865 | 8/2006 |
| CN | 102076833 | 5/2011 |

(Continued)

OTHER PUBLICATIONS

Canova, "Testing and Evaluating the Combustion Characteristics of Waste Fuels," 1992, 120 pages.

(Continued)

*Primary Examiner* — Huy Tram Nguyen
(74) *Attorney, Agent, or Firm* — Fish & Richardson P.C.

(57) ABSTRACT

This disclosure relates to a processing that includes a first shell and a second shell disposed within the first shell. The second shell includes a first end, a second end, and a wall extending between the first end and the second end. The second shell also defines a cavity and a longitudinal axis extending between the first end and the second end. A cross section of the second shell transverse to the longitudinal axis includes a first arcuate inner wall portion having a first radius of curvature and a second arcuate inner wall portion having a second radius of curvature. The first radius of curvature is larger than the second radius of curvature.

19 Claims, 9 Drawing Sheets

Related U.S. Application Data

(60) Provisional application No. 62/652,840, filed on Apr. 4, 2018.

(51) Int. Cl.
| | |
|---|---|
| *B01J 19/20* | (2006.01) |
| *B01J 8/10* | (2006.01) |
| *C10J 3/74* | (2006.01) |
| *C10L 5/06* | (2006.01) |
| *C10L 5/48* | (2006.01) |
| *C10L 5/44* | (2006.01) |
| *C10J 3/00* | (2006.01) |
| *C10L 9/08* | (2006.01) |
| *C10B 7/10* | (2006.01) |

(52) U.S. Cl.
CPC ............ *C10B 7/10* (2013.01); *C10J 3/007* (2013.01); *C10J 3/74* (2013.01); *C10L 5/06* (2013.01); *C10L 5/445* (2013.01); *C10L 5/48* (2013.01); *C10L 9/083* (2013.01); *B01J 2219/00085* (2013.01); *B01J 2219/182* (2013.01); *B01J 2219/1943* (2013.01); *B01J 2219/3188* (2013.01); *C10J 3/005* (2013.01); *C10L 2290/06* (2013.01); *C10L 2290/24* (2013.01); *C10L 2290/50* (2013.01); *C10L 2290/565* (2013.01)

(58) Field of Classification Search
CPC ............ C10L 2290/24; C10L 2290/06; C10L 2290/50; B01J 19/20; B01J 8/10; B01J 19/0066; B01J 2219/1943; B01J 2219/182; B01J 2219/00085; B01J 2219/3188; C10J 3/007; C10J 3/74; C10J 3/005
USPC ........................................................ 422/205
See application file for complete search history.

(56) References Cited

U.S. PATENT DOCUMENTS

| | | | |
|---|---|---|---|
| 3,874,835 | A | 4/1975 | Rossiter et al. |
| 4,176,969 | A | 12/1979 | Wallace et al. |
| 4,298,350 | A | 11/1981 | Bauer |
| 4,541,277 | A | 9/1985 | Starnes, Jr. |
| 4,636,085 | A | 1/1987 | Kopernicky |
| 4,752,139 | A | 6/1988 | Hauck |
| 5,161,888 | A | 11/1992 | Hauck |
| 5,265,979 | A | 11/1993 | Hansen |
| 5,345,955 | A | 9/1994 | Clearman et al. |
| 5,429,645 | A | 7/1995 | Benson et al. |
| 5,759,238 | A | 6/1998 | Yanagimachi et al. |
| 5,888,256 | A | 3/1999 | Morrison |
| 5,938,994 | A | 8/1999 | English |
| 6,126,842 | A | 10/2000 | Decker |
| 6,139,793 | A | 10/2000 | Vanderwal |
| 6,165,238 | A | 12/2000 | Parkinson et al. |
| 6,692,544 | B1 | 2/2004 | Grillenzoni |
| 7,252,691 | B2 | 8/2007 | Philipson |
| 8,157,874 | B2 | 4/2012 | Bohlig et al. |
| 8,157,875 | B2 | 4/2012 | Bohlig et al. |
| 8,192,512 | B2 | 6/2012 | Bohlig et al. |
| 8,192,513 | B2 | 6/2012 | Bohlig et al. |
| 8,349,034 | B2 | 1/2013 | Calabrese et al. |
| 8,377,153 | B2 | 2/2013 | Kluko |
| 8,382,862 | B2 | 2/2013 | Bohlig et al. |
| 8,382,863 | B2 | 2/2013 | Bohlig et al. |
| 8,444,721 | B2 | 5/2013 | Bai |
| 8,459,581 | B2 | 6/2013 | Bai |
| 8,523,962 | B2 | 9/2013 | Bohlig et al. |
| 8,579,997 | B2 | 11/2013 | Bai |
| 8,585,787 | B2 | 11/2013 | Bai et al. |
| 8,617,264 | B2 | 12/2013 | Bohlig et al. |
| 8,636,235 | B2 | 1/2014 | Bai |
| 8,721,746 | B2 | 5/2014 | Kiyama |
| 8,746,599 | B2 | 6/2014 | Bai |
| 8,828,105 | B2 | 9/2014 | Calabrese et al. |
| 8,852,302 | B2 | 10/2014 | Bai |
| 8,906,119 | B2 | 12/2014 | Bohlig et al. |
| 8,915,199 | B2 | 12/2014 | Bohlig et al. |
| 8,999,014 | B2 | 4/2015 | Bai |
| 9,062,268 | B2 | 6/2015 | Bai |
| 9,162,231 | B2 | 10/2015 | Bai |
| 9,181,508 | B2 | 11/2015 | Bohlig et al. |
| 9,217,188 | B2 | 12/2015 | Bohlig et al. |
| 9,487,722 | B2 | 11/2016 | Bai et al. |
| 9,523,051 | B2 | 12/2016 | Bai et al. |
| 9,771,536 | B2 | 9/2017 | White |
| 10,526,557 | B2 | 1/2020 | White |
| 10,618,025 | B2 * | 4/2020 | Ostvik ............ B01J 19/20 |
| 10,669,495 | B2 | 6/2020 | White |
| 10,738,255 | B2 | 8/2020 | White |
| 2005/0154114 | A1 | 7/2005 | Hale |
| 2008/0014112 | A1 | 1/2008 | Lee |
| 2008/0210089 | A1 | 9/2008 | Tsangaris et al. |
| 2009/0056205 | A1 | 3/2009 | Gauthier et al. |
| 2009/0154114 | A1 | 6/2009 | Peng et al. |
| 2009/0320358 | A1 | 12/2009 | Kobayashi |
| 2010/0031560 | A1 | 2/2010 | Calabrese et al. |
| 2010/0234557 | A1 | 9/2010 | Sato et al. |
| 2010/0261895 | A1 | 10/2010 | Noll et al. |
| 2011/0078947 | A1 | 4/2011 | Kiyama |
| 2011/0272858 | A1 | 11/2011 | Tamir |
| 2012/0065440 | A1 | 3/2012 | Fraczak et al. |
| 2012/0279115 | A1 | 11/2012 | Ruiters |
| 2013/0055630 | A1 | 3/2013 | Bohlig et al. |
| 2013/0097921 | A1 | 4/2013 | Calabrese et al. |
| 2013/0192127 | A1 | 8/2013 | Rhatigan |
| 2013/0240343 | A1 | 9/2013 | Wolfe |
| 2013/0298455 | A1 | 11/2013 | Bai |
| 2014/0096441 | A1 | 4/2014 | Bai et al. |
| 2015/0368563 | A1 | 12/2015 | Funk |
| 2016/0122672 | A1 | 5/2016 | White |
| 2016/0122673 | A1 | 5/2016 | White |
| 2016/0122674 | A1 | 5/2016 | White |
| 2018/0002624 | A1 | 1/2018 | White |
| 2019/0308159 | A1 | 10/2019 | Ostvik et al. |
| 2020/0216771 | A1 | 7/2020 | White |
| 2021/0102136 | A1 | 4/2021 | White |
| 2021/0122989 | A1 | 4/2021 | White |

FOREIGN PATENT DOCUMENTS

| | | |
|---|---|---|
| CN | 102089412 | 6/2011 |
| CN | 102348514 | 2/2012 |
| EP | 02090641 | 8/2009 |
| EP | 2127738 | 12/2009 |
| EP | 2314662 | 4/2011 |
| JP | 2000-273460 | 10/2000 |
| JP | 2010-018725 | 12/2010 |
| JP | 2011-526324 | 10/2011 |
| JP | 2012-515080 | 7/2012 |
| TW | 200604288 | 2/2006 |
| WO | WO 2006041439 | 4/2006 |
| WO | WO 2007145507 | 12/2007 |
| WO | WO 2008012951 | 1/2008 |
| WO | WO 2010013202 | 2/2010 |
| WO | WO 2010082202 | 7/2010 |

OTHER PUBLICATIONS

Even et al., "Evaluation of the Ames Solid Waste Recovery System", Part I, Summary of Environmental Emissions: Equipment, Facilities, and Economic Evaluations, EPA-600/2-77-205, Nov. 1977, 215 pages.

Fritsky et al., "Methodology for Modeling the Devolatilization of Refuse-Derived Fuel from Thermogravimetric Analysis of Municipal Solid Waste Components", J. Air & Waste Manage. Assoc. 44:9, 1994, 9 pages.

(56) References Cited

OTHER PUBLICATIONS

Garg et al., "Wastes as Co-Fuels: the Policy Framework for Solid Recovered Fuel (SRF) in Europe, with UK Implications", Environ. Science & Tech. 41.14, 2007, 19 pages.
Gendebien et al., "Refuse Derived Fuel, Current Practice and Perspectives (B4-3040/2000/306517/MAR/E3)", Final Report No. CO 5087-4, Jul. 2003, 229 pages.
International Search Report and Written Opinion in International Application No. PCT/US2019/025844, dated Jun. 28, 2019, 14 pages.
Olexsey, "Evaluation of the Performance of the Disc Screens Installed at the City of Ames, Iowa Resource Recovery Facility", Proc. ASME National Solid Waste Processing Conf., Washington, DC, 1980, 11 pages.
Paul et al., "Handbook of Industrial Mixing: Science and Practice," 2004, 1432 pages.
Raghunathan et al., "Prevention of PCDD/PCDF Formation by Coal Co-Firing", U.S. Environmental Protection Agency, Air Pollution Prevention and Control Division, 1998, 15 pages.
Study of Existing RDF-Cofiring Experience, vol. 3: Phase II Final Report, ANL/CNSV-TM-134, vol. 3, Oct. 31, 1983, 180 pages.
Yu Jie et al., "Thermal degradation of PVC: a review", Waste Management, vol. 48, Dec. 10, 2015, pp. 300-314.
Yoshikawa et al., "Hydrothermal treatment of municipal solid waste to produce solid fuel," 7th International Energy Conversion Engineering Conference (Aug. 2-5, 2009, Denver, Colorado), 2009, 23 pages.

\* cited by examiner

PROCESS VESSEL FOR FORMING FUEL COMPOSITIONS AND RELATED SYSTEMS AND METHODS

CROSS-REFERENCE TO RELATED APPLICATION

This application is a continuation application which claims priority to U.S. patent application Ser. No. 16/374,444 filed on Apr. 3, 2019, now is U.S. Pat. No. 10,618,025, which claims the benefit of U.S. Patent Application No. 62/652,840, filed on Apr. 4, 2018, which is incorporated by reference herein in its entirety.

TECHNICAL FIELD

This disclosure relates to a process vessel for producing solid compositions, as well as related systems and methods. In particular, a process vessel for producing solid fuel compositions from solid wastes are disclosed herein.

BACKGROUND

It is desirable to manage solid wastes, such as municipal wastes from residential, institutional, and commercial sources, agricultural wastes, and other wastes such as sewage sludge. As landfills reach and exceed capacity worldwide, and as the solid waste industry and societies generally limit the use of landfills, methods of managing solid wastes have been developed to reduce the volume of solid waste introduced into landfills. Recycling of metals, plastics, and paper products, as well as composting organic matter are methods of reducing the overall volume of solid wastes going to landfills. Waste-to-energy processes have also been developed to convert the energy content of solid wastes into a more usable form, such as electrical power.

SUMMARY

This disclosure relates to a process vessel for producing compositions, such as solid fuel compositions, having a desired homogeneity, density and/or moisture content, as well as related systems and methods. In particular, some embodiments provided herein include a process vessel, a system, and a method for producing solid fuel compositions from solid wastes. For example, the process vessel provided herein can produce a desired composition (e.g., a solid fuel composition) from feedstock materials (e.g., solid wastes and other wastes).

In one general aspect, this disclosure provides a process vessel including a first shell and a second shell disposed within the first shell. The second shell includes a first end, a second end, and a wall extending between the first end and the second end. The second shell defines a cavity and a longitudinal axis extending between the first end and the second end. A cross section of the second shell transverse to the longitudinal axis includes a first arcuate inner wall portion having a first radius of curvature. The cross section of the second shell transverse to the longitudinal axis includes a second arcuate inner wall portion having a second radius of curvature. The first radius of curvature is larger than the second radius of curvature.

Certain aspects of the subject matter described in this disclosure can be implemented as a system including a composition and a process vessel configured for processing the composition. The process vessel includes an inlet opening, an outlet opening, a first shell, and a second shell disposed within the first shell. The second shell includes a first end, a second end, and a wall extending between the first end and the second end. The second shell defines a cavity to hold the composition during processing and a longitudinal axis extending between the first end and the second end. A cross section of the second shell transverse to the longitudinal axis includes a first arcuate inner wall portion having a first radius of curvature and a second arcuate inner wall portion having a second radius of curvature. The first radius of curvature is larger than the second radius of curvature. The process vessel is configured to form, from the composition, a solid fuel composition including an energy content of at least about 8,000 British thermal units per pound.

Certain aspects of the subject matter described in this disclosure can be implemented as a method. A composition is heated within a process vessel. The process vessel includes a first shell and a second shell disposed within the first shell. The second shell includes a first end, a second end, a wall extending between the first end and the second end, and a heating jacket coupled to the wall. The heating jacket is configured to heat the wall. The second shell defines a cavity to hold the composition during processing. The second shell defines a longitudinal axis extending between the first end and the second end. A cross section of the second shell transverse to the longitudinal axis includes a first arcuate inner wall portion having a first radius of curvature and a second arcuate inner wall portion having a second radius of curvature. The first radius of curvature is larger than the second radius of curvature. The composition is mixed with first and second mixers disposed in the cavity of the second shell. As used herein, "mix" generally refers to agitate, combine, or blend. The composition is extruded with an extruder element disposed in the cavity of the second shell. As used herein, "extruded" generally refers to densified or shaped, and "extruder element" generally refers to a device suitable for densifying or shaping a solid composition. A solid fuel composition is formed from the composition. The solid fuel composition includes an energy content of at least about 8,000 British thermal units per pound.

The aspects provided above, and other aspects, can include one or more of the following features.

An annular enclosure can be defined between the first shell and the second shell.

The process vessel can include one or more support structures disposed within the annular enclosure. At least a portion of the support structure can extend transverse to the longitudinal axis and can extend circumferentially about a portion of an exterior surface of the second shell.

The process vessel can include a heating jacket coupled to the wall of the second shell.

The heating jacket can be disposed along an inner surface of the wall of the second shell.

The heating jacket can be disposed along an exterior surface of the wall of the second shell.

The process vessel can include an insulating material disposed within the annular enclosure.

The process vessel can include a pump operatively coupled to the first and second shells, and the pump can be configured to reduce a pressure within the cavity, the annular enclosure, or both.

The process vessel can be configured so that, during use of the pump, the cavity has a first pressure, and the annular enclosure has a second pressure. The first and second pressures can be within a 10% deviation.

The cavity can have a first pressure, and the annular enclosure can have a second pressure, where a pressure differential between the first and second pressures is no greater than 5 pounds per square inch.

The first shell can include a first outer end, a second outer end, and first shell wall defining a cylindrical shape that extends between the first outer end and the second outer end.

The cross section of the second shell transverse to the longitudinal axis can include a third arcuate inner wall portion and a fourth arcuate inner wall portion.

The second arcuate inner wall portion can extend between the third arcuate inner wall portion and the fourth arcuate inner wall portion.

The third arcuate inner wall portion can have a third radius of curvature, and the fourth arcuate inner wall portion can have a fourth radius of curvature that is identical to the third radius of curvature The third arcuate inner wall portion and the fourth arcuate inner wall portion can each have a radius of curvature that is larger than the second radius of curvature of the second arcuate inner wall potion.

The second arcuate inner wall portion can form a channel between curved surfaces formed by the third arcuate inner wall portion and the fourth arcuate inner wall portion.

The process vessel can include an extruder element disposed in the cavity of the second shell, a first mixer disposed in the cavity of the second shell, and a second mixer disposed in the cavity of the second shell. The longitudinal axis can be a first longitudinal axis. The extruder element can define a second longitudinal axis. The first mixer can define a third longitudinal axis. The second mixer can define a fourth longitudinal axis.

The extruder element can be disposed adjacent to the second arcuate inner wall portion. The first mixer can be disposed adjacent to the third arcuate inner wall portion. The second mixer can be disposed adjacent to the fourth arcuate inner wall portion.

The extruder element can include an extrusion screw.

The first mixer and the second mixer can each include a rotary mixing blade.

The extruder element can be disposed within the channel.

The extruder element can be spaced apart from each of the first mixer and the second mixer by a first gap, and the first mixer and the second mixer can be spaced apart from each other by a second gap.

The second gap can be larger than the first gap.

The second, third, and fourth longitudinal axes can be offset from the first longitudinal axis.

The first longitudinal axis can be separated from the third longitudinal axis and the fourth longitudinal axis by a first distance and a second distance, respectively, where a difference between the first and second distances is no more than 5% of the first or second distance.

The first longitudinal axis can be separated from the third longitudinal axis and the fourth longitudinal axis by a first distance and a second distance, respectively, where a difference between the first and second distances is no more than 0.5 meters (m).

The first longitudinal axis can be parallel to the second longitudinal axis, the third longitudinal axis, the fourth longitudinal axis, or combinations of these.

The second longitudinal axis can be separated from the third longitudinal axis and the fourth longitudinal axis by a third distance and a fourth distance, respectively, where a difference between the third and fourth distances is no more than 5% of the first or second distance.

The second longitudinal axis can be separated from the third longitudinal axis and the fourth longitudinal axis by a third distance and a fourth distance, respectively, where a difference between the first and second distances is no more than 0.5 meters (m).

The second, third, and fourth longitudinal axes can form a triangular geometry in the cross section of the second shell.

The first, second, third, and fourth longitudinal axes can form a quadrilateral geometry in the cross section of the second shell.

The second arcuate inner wall portion can define a central angle with respect to the extruder element. The central angle can extend from about 180 degrees) (°) to about 300°.

The third arcuate inner wall portion and the fourth arcuate inner wall portion can each define an arc length having an angle that extends from about 10 degrees (°) to about 60°.

This, and other aspects, can include one or more of the following features.

An annular enclosure can be defined between the first shell and the second shell.

The system can include a heating jacket coupled to the wall of the second shell. The heating jacket can be configured to heat the wall of the second shell.

The system can include an insulating material disposed within the annular enclosure.

The system can include a pump system operatively coupled to the first and second shells, and the pump system can be configured to reduce the pressure or generate a vacuum within the cavity, the annular enclosure, or both.

The pump system can be configured to set the cavity at a first pressure and set the annular enclosure at a second pressure, where the first and second pressures are equal.

The pump system can be configured to set the cavity at a first pressure and set the annular enclosure to a second pressure, where a pressure differential between the first and second pressures is no greater than 5 pounds per square inch.

The cross section of the second shell transverse to the longitudinal axis can include a third arcuate inner wall portion and a fourth arcuate inner wall portion.

The process vessel can include an extruder element disposed in the cavity of the second shell, a first mixer disposed in the cavity of the second shell, and a second mixer disposed in the cavity of the second shell.

The extruder element can be disposed adjacent to the second arcuate inner wall portion. The first mixer can be disposed adjacent to the third arcuate inner wall portion. The second mixer can be disposed adjacent to the fourth arcuate inner wall portion.

The second arcuate inner wall portion can form a channel. The extruder element can be disposed within the channel.

The first mixer can be configured to rotate the composition in a first direction, and the second mixer can be configured to rotate the composition in a second direction opposite the first direction.

The extruder element can be configured to circulate the composition in the cavity or transport the solid fuel composition out of the process vessel through the outlet opening.

The extruder element can be configured to, when the extruder element is rotating in a first direction, transport the solid fuel composition out of the process vessel through the outlet opening.

The extruder element can be configured to, when the extruder element is rotating in a second direction, circulate the composition in the cavity.

The subject matter described in this disclosure can be implemented in particular embodiments, so as to realize one or more of the following advantages. For example, in various embodiments, the process vessel provided herein can be used to transform a feedstock material(s) into a more useful composition by modifying, reducing, and/or eliminating one or more characteristics and/or elements of the feedstock material. For example, in some embodiments, the process vessel provided herein can form a desired composition (e.g., a solid fuel composition) from a feedstock (e.g., solid waste) that reduces or eliminates odors, bacteria, and other undesirable properties of the feedstock. In some embodiments, the process vessel described herein transforms a feedstock material (e.g., solid waste) having a variable composition (e.g., a mixture of different types of solid waste) into a composition (e.g., a solid fuel composition) that is a relatively consistent (e.g., homogeneous), more compact (e.g., having a high density), and/or has a low moisture content (e.g., dry, <2 wt. % water).

In some embodiments, the process vessel provided herein can provide a solid fuel composition in the form of a homogenized, dry, dense, and energy-rich fuel primed for subsequent processing (e.g., pyrolysis or gasification). For example, the process vessel provided herein can produce a desired composition (e.g., a solid fuel composition) that provides efficient operation for subsequent processing (e.g., feedstock for a pyrolysis or gasification chamber as part of a waste-to-energy process) without additional capital investment in advanced machinery. The process vessel provided herein can produce the desired composition in a compact form having a density of at least 20 pounds per cubic foot ($lb/ft^3$). In some embodiments, the process vessel provided herein produce the desired composition in a compact form having a density in a range from 20 $lb/ft^3$ to 80 $lb/ft^3$, from 30 $lb/ft^3$ to 70 $lb/ft^3$, from 40 $lb/ft^3$ to 60 $lb/ft^3$, or from 42 $lb/ft^3$ to 57 $lb/ft^3$. The process vessel provided herein can produce the desired composition having a moisture content of no more than 45 weight percent (wt %). In some embodiments, the process vessel provided herein produces the desired composition having a moisture content in a range from 1 wt % to 45 wt %, from 1 wt % to 15 wt %, from 1 wt % to 20 wt %, from 1 wt % to 30 wt %, from 1 wt % to 40 wt %, from 10 wt % to 40 wt %, or from 20 wt % to 30 wt %.

In some embodiments, the process vessel provided herein provides a suitable design for heating, mixing, drying, and/or extruding the feedstock materials. For example, certain embodiments of the process vessel provided herein define a volume suitable for mixing and heating a composition (e.g., solid waste) such that air voids within the final composition (e.g., solid fuel composition) is reduced and/or to provide uniform dispersion of components in the final composition. In some embodiments, the process vessel includes at least two mixers (e.g., mixing blades) configured to actuate in a counter-rotation direction with respect to one another to improve circulation and mixing of the composition (e.g., solid waste) during processing. The configuration of the process vessel and manner in which the components move with respect to one another can improve moisture removal from the composition (e.g., solid waste). For example, the at least two mixers can circulate the composition (e.g., solid waste), such that moisture does not get entrapped or entrained within the composition. In some embodiments, the process vessel provided herein includes a pump for reducing pressure and/or removing moisture from the materials during processing of the composition (e.g., solid waste) at lower temperatures, which can reduce processing time, heat, and energy required for producing the desired final composition (e.g., solid fuel composition). The process vessel provided herein includes inner and outer shells. The inner and outer shell configuration can reduce inner structural reinforcement, which may otherwise be necessary due to vacuum operation within the process vessel. The inner and outer shell configuration can also increase heat transfer surface area, thereby increasing the overall heating efficiency of the process. The inner and outer shell configuration also enables the overall system to be rated for full vacuum operation. Vacuum operation also allows for higher operating temperatures to be achieved within the process vessel without the risk of combustion occurring within the process vessel. Breakdown of organic matter can be improved in vacuum operation within the process vessel provided herein. In some embodiments, the disclosure provides a size-efficient process vessel that can produce a densified, dry (e.g., <2 wt. % water) composition.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

This disclosure describes a process vessel for producing compositions, such as solid fuel compositions, as well as related systems and methods. In particular, the process vessel provided herein can produce a desired composition (e.g., a solid fuel composition) from feedstock materials (e.g., solid wastes and other wastes). For example, various embodiments of a process vessel (or a system) and a method for producing solid fuel compositions from a solid waste mixture are disclosed herein. In various embodiments, the process vessel provided herein is configured to process feedstock material that includes waste (e.g., solid waste). As used herein, "waste" refers to carbon-containing combustible material discarded after its primary use, and "solid waste" is any garbage, refuse, or sludge.

In some embodiments, the process vessel provided herein is not limited to producing solid fuel compositions. For example, the process vessel (or a system) and method relating thereto provided herein may be used to produce other types of compositions from feedstock materials (e.g., a mixture of materials). In some embodiments, the process vessel provided herein can produce a desired composition (e.g., a uniformly mixed or blended solid composition) from feedstock materials (e.g., a mixture of different materials). In some embodiments, the process vessel provided herein can produce the desired composition having a moisture content less than the moisture content of the feedstock materials. For example, the process vessel provided herein can produce the desired composition having a moisture content of no more than 45 weight percent (wt %). In some embodiments, the process vessel provided herein can produce the desired composition in a compact form having a density higher than the density of the feedstock materials. For example, the process vessel provided herein can produce the desired composition in a compact form having a density of at least 20 pounds per cubic feet (lb/ft).

Figure 1A:
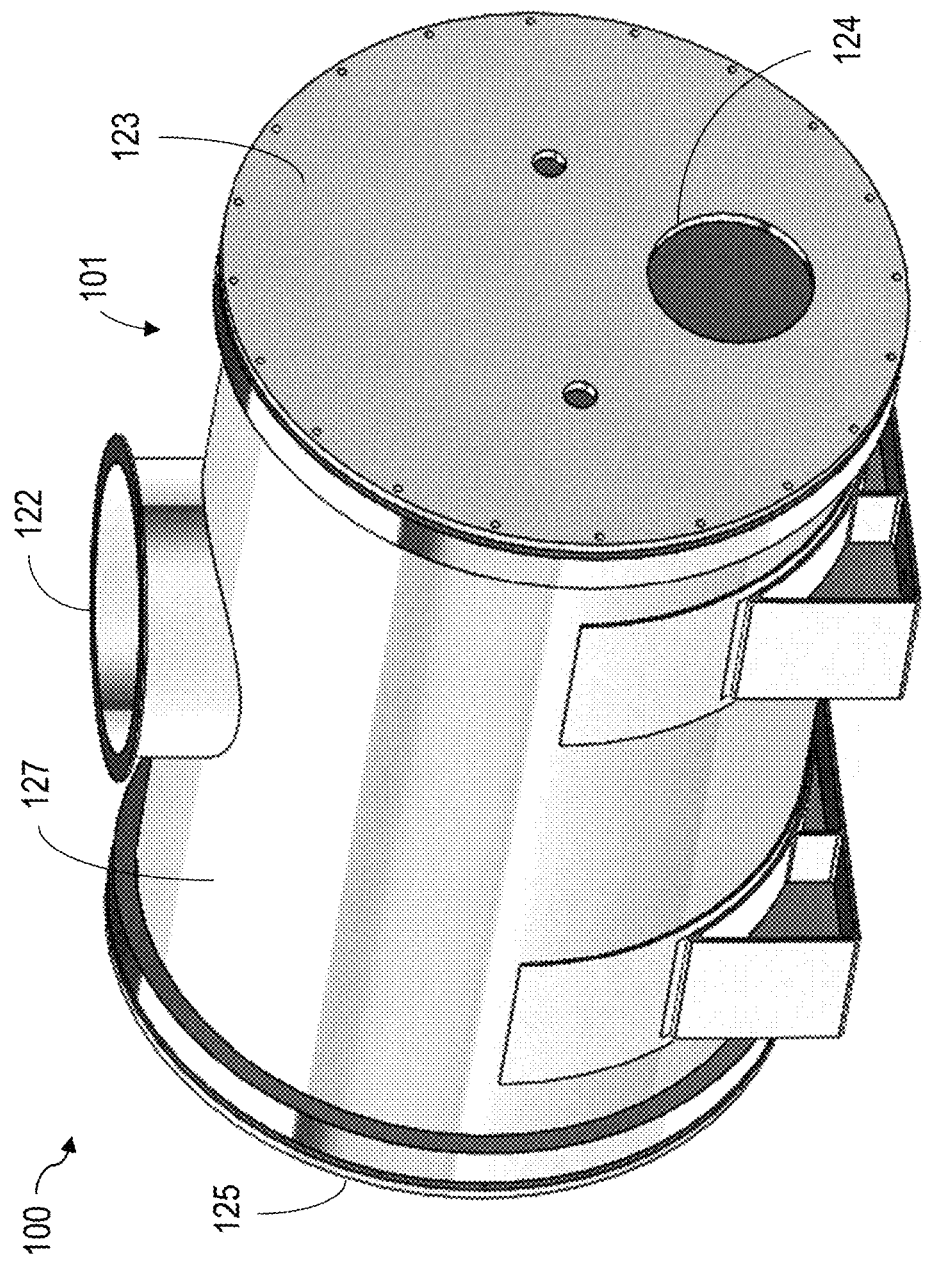
FIG. 1A is a perspective view of a process vessel.
Figure 1B:
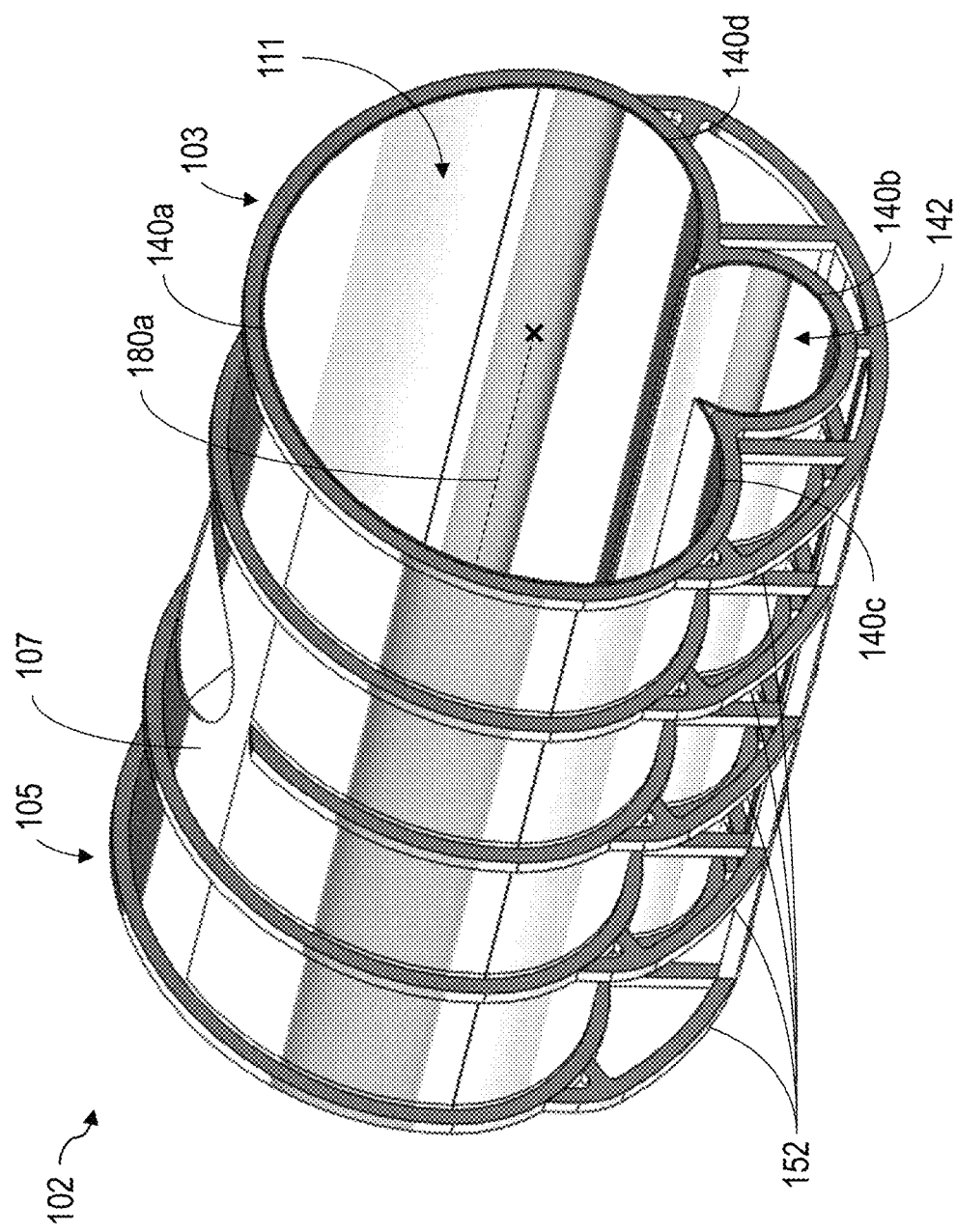
FIG. 1B is a perspective view showing an inner shell of the process vessel of FIG. 1A.

FIGS. 1A and 1B show a process vessel 100. The process vessel 100 includes an outer shell 101 and an inner shell 102 disposed within the outer shell 101. The outer shell 101 includes a first outer end 123, a second outer end 125, and an outer shell wall 127 which defines a cylindrical shape that extends between the first outer end 123 and the second outer end 125. The outer shell 101 includes an inlet 122 on the outer shell wall 127. The outer shell 101 includes an outlet 124 on the first outer end 123. In general, the absolute and relative size of the various components depicted in FIG. 1A can be varied as desired. For example, The outer shell 101 may vary in overall size depending on various factors, such as the type or shape of mixers (described later) included within the outer shell 101, desired footprint of the process vessel 100 at a waste-to-energy facility, or desired size for the ability to transport a module including the process vessel 100 to a waste-to-energy facility. While depicted as cylindrical in FIG. 1A, in some embodiments, the outer shell 101 may include other shapes, such as cubic, cuboidal, spherical, or any irregular shape.

The absolute and relative size of the outer shell can be varied as desired. For example, in some embodiments, the length of the outer shell 101 may range from about 5 feet to about 20 feet. In some embodiments, the height and width of the outer shell 101 may each range from about 5 feet to about 10 feet. In some embodiments, the outer shell 101 can have a length of about 9 feet, a width of about 6 feet, and a height of about 6 feet. In some embodiments, the length-to-width ratio of the outer shell is from about 0.5 to about 4.0, e.g., from about 0.75 to about 3.0, from about 1.0 to about 2.5, or from about 1.5 to about 2.0. In some embodiments, the length-to-height ratio of the outer shell is from about 0.5 to about 4.0, e.g., from about 0.75 to about 3.0, from about 1.0 to about 2.5, or from about 1.5 to about 2.0. In some embodiments, the width-to-height ratio of the outer shell is from about 0.5 to about 2, e.g., from about 0.75 to about 1.75, or from about 1.0 to about 1.5.

The inner shell 102 of the process vessel 100 is disposed within the outer shell 101. The inner shell 102 includes a first end 103, a second end 105, and a wall 107 extending between the first end 103 and the second end 105. The inner shell 102 defines a cavity 111 and a longitudinal axis 180a extending between the first end 103 and the second end 105.

The outer shell 101 can include one or more metals (including alloys thereof), ceramics, polymers, composites, or combinations thereof. Examples of suitable materials for constructing the outer shell 101 include, but are not limited to, titanium, stainless steel, carbon steel, and combinations or alloys thereof. In some embodiments, the material (e.g., a metal) includes an internal wetted surface, such as a metallic coating or metallic cladding suitable for providing oxidation resistance. The inner shell 102 can include one or more metals (including alloys thereof), ceramics, polymers, composites, or combinations thereof. Examples of suitable materials for constructing the inner shell 102 include, but are not limited to, titanium, 304 class stainless steel, 316 class stainless steel, appropriate chromium/nickel alloys, and other alloy variants resistant to oxidation and abrasion.

Figure 2A:
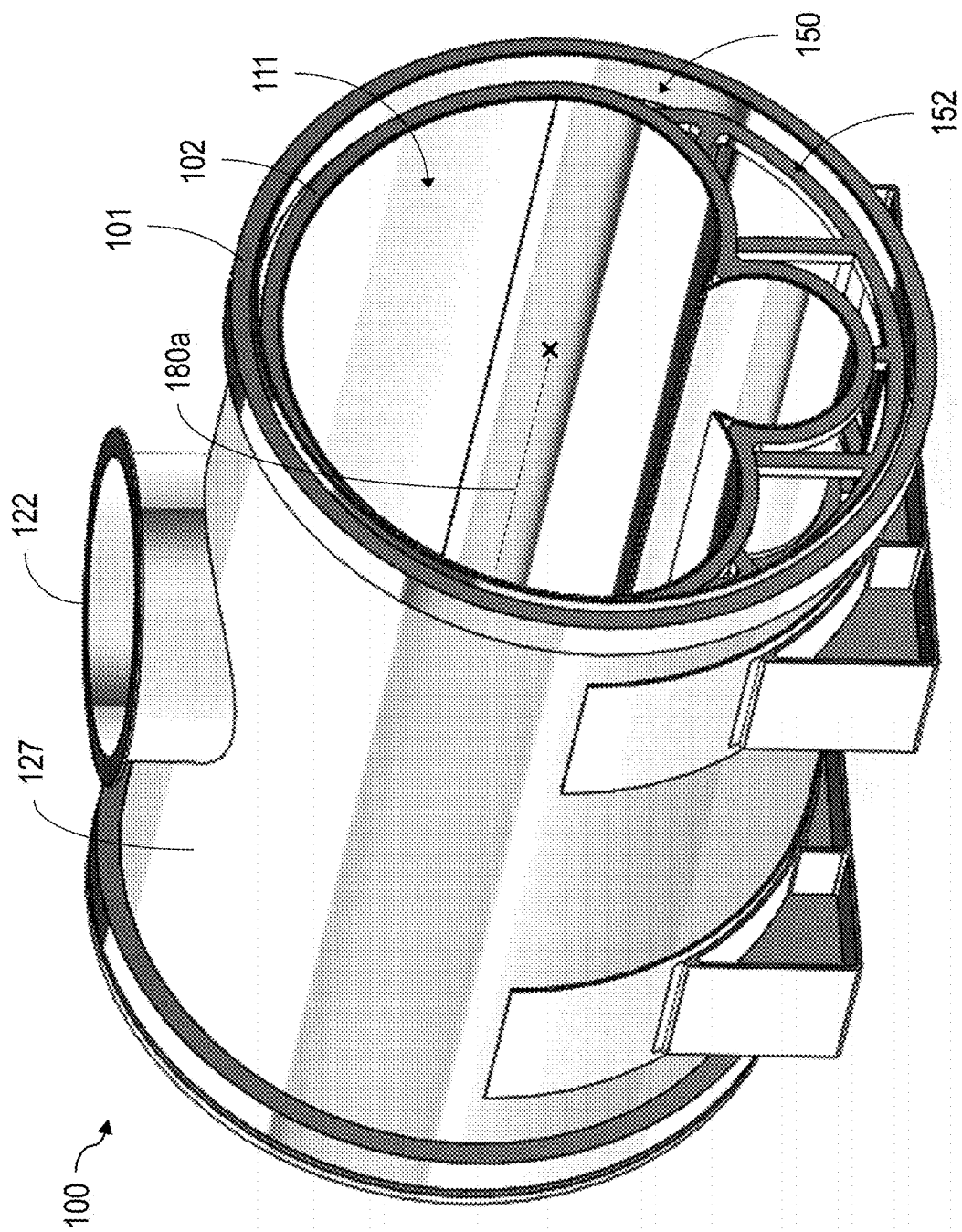
FIG. 2A is another perspective view of the process vessel of FIG. 1A.
Figure 2B:
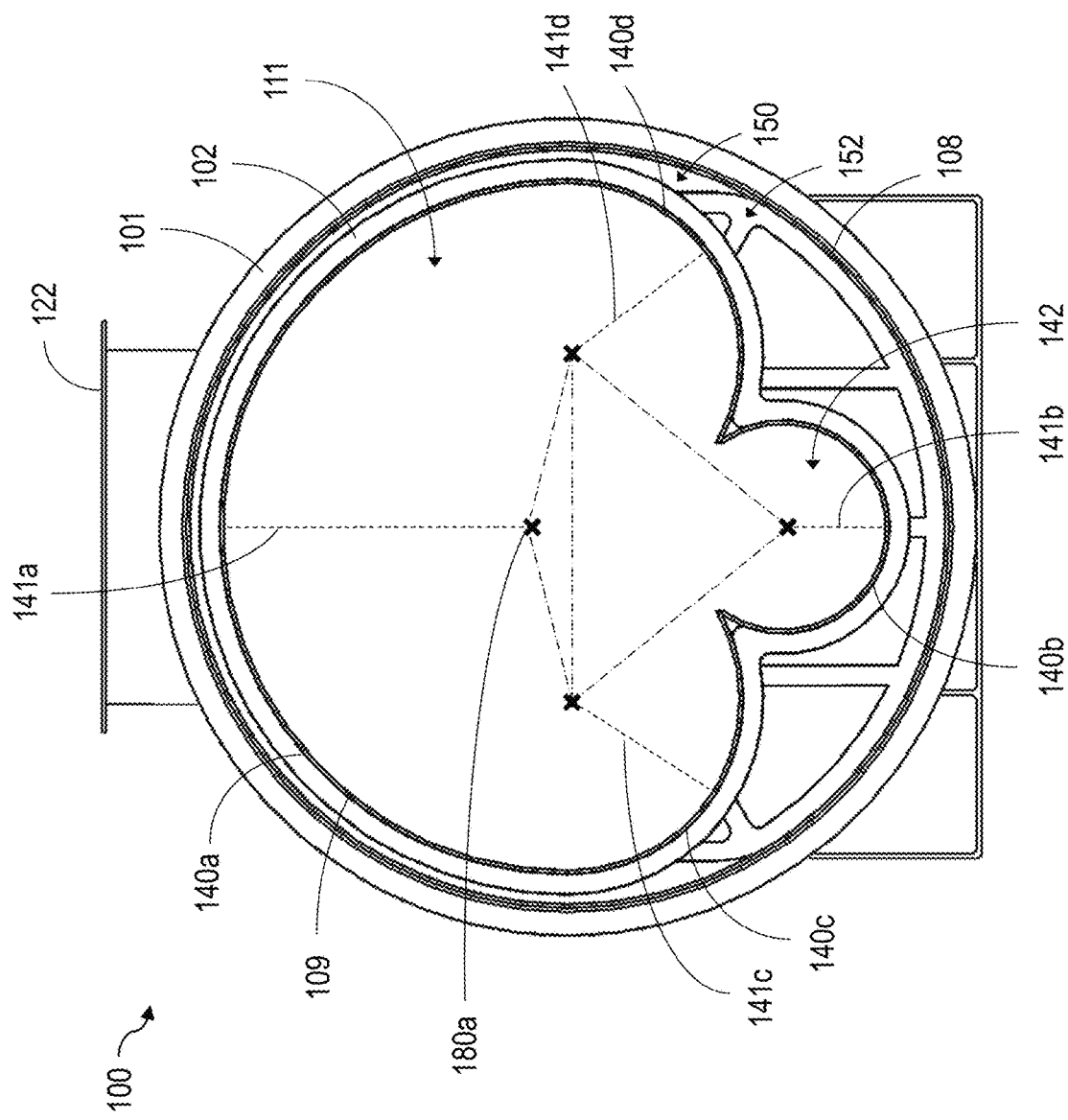
FIG. 2B is a cross-sectional view of the process vessel of FIG. 1A.

FIGS. 2A and 2B show a process vessel 100. The first outer end 123 is omitted from the illustration shown in FIG. 2A for the purpose of showing the inside of the process vessel 100. A cross section of the inner shell 103 is transverse to the longitudinal axis 180a. The cross section includes a first arcuate inner wall portion 140a having a first radius of curvature 141a and a second arcuate inner wall portion 140b having a second radius of curvature 141b. The first radius of curvature 141b is larger than the second radius of curvature 141c. In some embodiments, the cross section of the inner shell 103 transverse to the longitudinal axis 180a includes a third arcuate inner wall portion 140c and a fourth arcuate inner wall portion 140d. The second arcuate inner wall portion 140b can extend between the third arcuate inner wall portion 140c and the fourth arcuate inner wall portion 140d. The third arcuate inner wall portion 140c can have a third radius of curvature 141c, and the fourth arcuate inner wall portion 140d can have a fourth radius of curvature 141d. In some embodiments, the third radius of curvature 141c and the fourth radius of curvature 141d are identical. The third radius of curvature 141c and the fourth radius of curvature 141d can be larger than the second radius of curvature 141b of the second arcuate inner wall portion 140b. The second arcuate inner wall portion 140b can form a channel 142 between curved surfaces formed by the third arcuate inner wall portion 140c and the fourth arcuate inner wall portion 140d.

The process vessel 100 can include a heating structure coupled to or forming an exterior surface of the inner shell 102 or coupled to or forms an interior surface of the inner shell 102. The heating structure may be in the form of a heating jacket. In some embodiments, a heating jacket 109 is coupled to or forms a surface of the wall 107 of the inner shell 102. In some embodiments, the heating jacket 109 is disposed along or forms an exterior surface of the wall 107 of the inner shell 102. In some embodiments, the heating jacket 109 is disposed along or forms an inner surface of the wall 107 of the inner shell 102. The heating jacket 109 can heat the wall 107 of the inner shell 102. Any suitable heater design may be selected as the heating jacket 109, such as an electrical heating jacket, an inductive heating jacket, or a convective heating jacket (for example, a heated oil jacket). The heating jacket 109 transfers heat into the cavity 111, and the solid waste mixture may be heated within the cavity 111 through conduction from the heating jacket 109 to a portion of the solid waste mixture in contact with the heating jacket 109 and through convection. In some embodiments, the heating structure (e.g., heating jacket) includes a second shell installed over a portion of a wall of the vessel that forms an annular space containing a heating (or cooling) medium. In some embodiments, an exemplary heating structure includes half-pipe coil jackets, dimple jackets, plate coils, and pillow plates.

A heat transfer fluid can be circulated through the heating structure (e.g., heating jacket 109) as a heating medium. The heat transfer fluid flows through the heating structure to provide heat to the process vessel 100. A heater can be included to heat the heat transfer fluid, and a circulation pump can be included to circulate the reheated heat transfer fluid to the heating structure. The heat transfer fluid can be, for example, a heated oil. In some implementations, the heating structure includes a hollow shell with heated oil circulating within the hollow shell. In some implementations, the heating structure is one, continuous member. In some implementations, the heating structure is made up of multiple, discrete portions. In some embodiments, the heating structure can include multiple heating panels formed around and welded to the outer surface of the inner shell 102. The temperature of the heated oil may be increased by passing the oil through any suitable heat exchanger. In some embodiments, the process vessel 100 can include a plurality of heating structures.

The outer shell 101 is configured to withstand an internal vacuum. An annular enclosure 150 is defined between the outer shell 101 and the inner shell 102. The process vessel 100 can include a pump (e.g., a vacuum pump) operatively coupled to the outer shell 101 and the inner shell 102. The pump can be used so that a difference between the pressure in the cavity 111 and the pressure in the annular enclosure 150 is no greater than 5 pounds per square inch (psi). In some embodiments, the pump can be used such that the pressure within the cavity 111 and the pressure within the annular enclosure 150 are equal. In some embodiments, the inner shell 102 does not experience a pressure differential because the pressure within the inner shell 102 (that is, the pressure within the cavity 111) and the pressure exterior to the inner shell 102 (that is, the pressure within the annular enclosure 150) are equal. Therefore, the inner shell 102 can have a thickness that is thinner in comparison to a shell that would need to be designed to withstand a pressure differential between an interior vacuum operation and the atmosphere. Additionally, the process vessel 100 can include an insulating material 108 disposed within the annular enclosure 150, so that heat losses to the surrounding environment (for example, through the outer shell 101 to the atmosphere) can be decreased. By surrounding the inner shell 102 with insulating material 108, the energy efficiency of the process vessel can be increased. Suitable insulating materials can withstand high temperature operation, for example, at least up to the maximum temperature of the heating structure (e.g., heating jacket 109). In some embodiments, the insulating material 108 can be hydrophobic to reduce or prevent moisture buildup in the annular cavity. In some embodiments, the insulating material 108 can be chemically inert to reduce or prevent deterioration of the insulating material over time. The insulating material 108 can optionally have a high density. Examples of suitable insulating materials include, but are not limited to, cellular gas and ceramic fiber. In some embodiments, the insulating material 108 is coupled to the inner shell 102. In some embodiments, the insulating material 108 covers at least a portion of the heating jacket 109. In some embodiments, the insulating material 108 is coupled to the heating jacket 109. The insulating material 108 can be coupled to the outer shell 101 (for example, an inner surface of the outer shell 101). The insulating material 108 can be coupled to the inner shell 102 (for example, an inner surface of the inner shell 102, an outer surface of the inner shell 102, or both). The insulating material 108 can be coupled to one or multiple support structures 152.

The inner shell 102 is maintained in position within the outer shell 101 by a support structure 152 (best shown in FIG. 1B) disposed within the annular enclosure 150. The support structure 152 can include a continuous body defined by a curved base and rib-like portions extending from the curved base. In some embodiments, portions (e.g., rib-like portions) of the support structure 152 can extend transverse to the longitudinal axis 180*a* and extend circumferentially about a portion of an exterior surface of the inner shell 102. The support structure 152 can be coupled to the outer shell 101 and the inner shell 102. The support structure 152 can absorb at least a portion of the mechanical stress generated from rotating components (such as mixers and extruder elements, which are described later). In some embodiments, the support structures absorb a majority (that is, more than 50%) of the mechanical stress generated from rotating components. Because of the support structure 152, the inner shell 102 design can be configured to withstand thermal stresses associated with the heating used to form the solid fuel composition from the solid waste mixture. Examples of suitable materials for constructing the support structure 152 include, but are not limited to, 304 class stainless steel, 316 stainless steel, appropriate chromium/nickel alloys, and other alloy variants resistant to oxidation and weld-compatible with the inner shell 102 or inner liner material (if included on the inner surface of the inner shell 102).

Figure 3A:
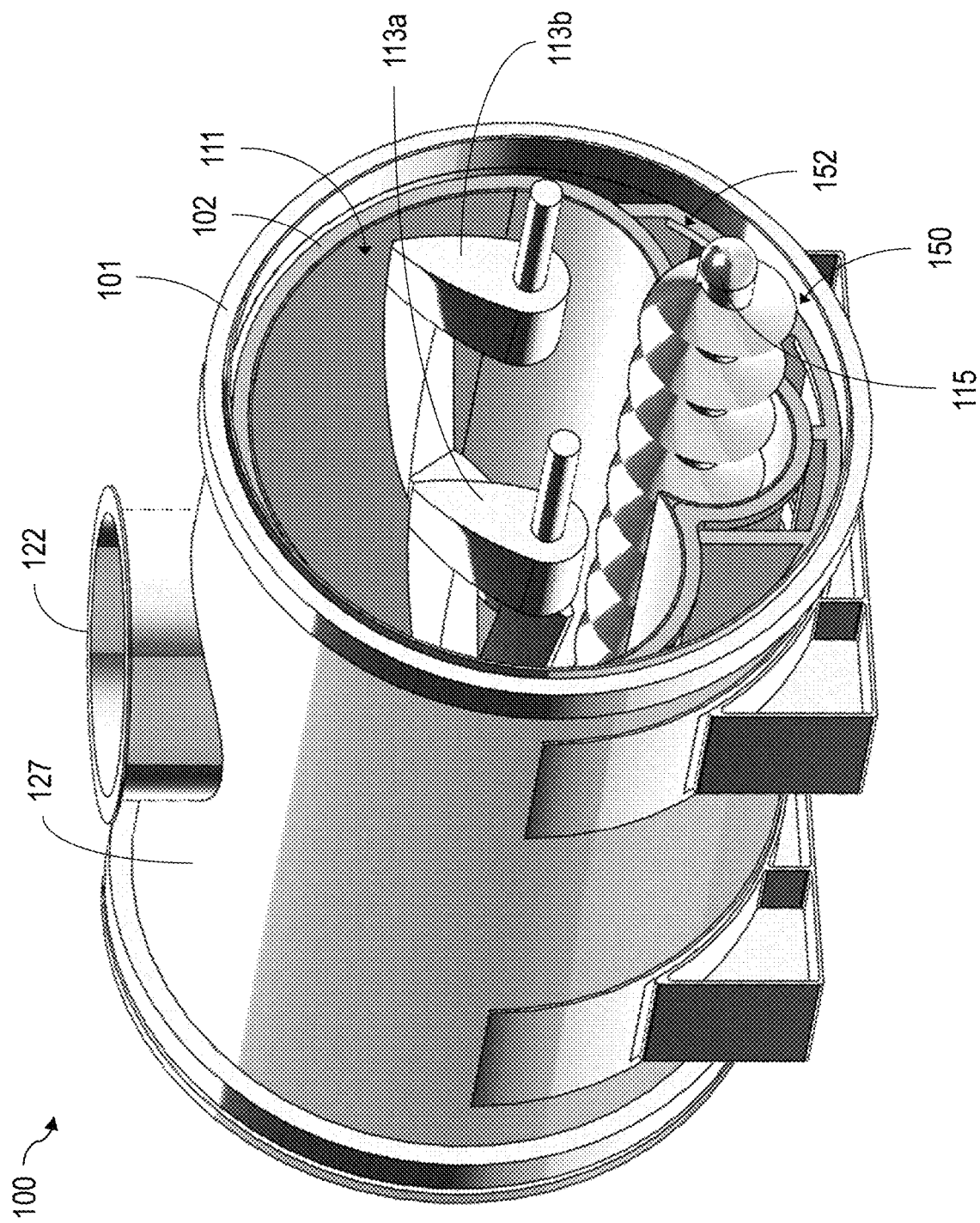
FIG. 3A is another perspective view of the process vessel of FIG. 1A.
Figure 3B:
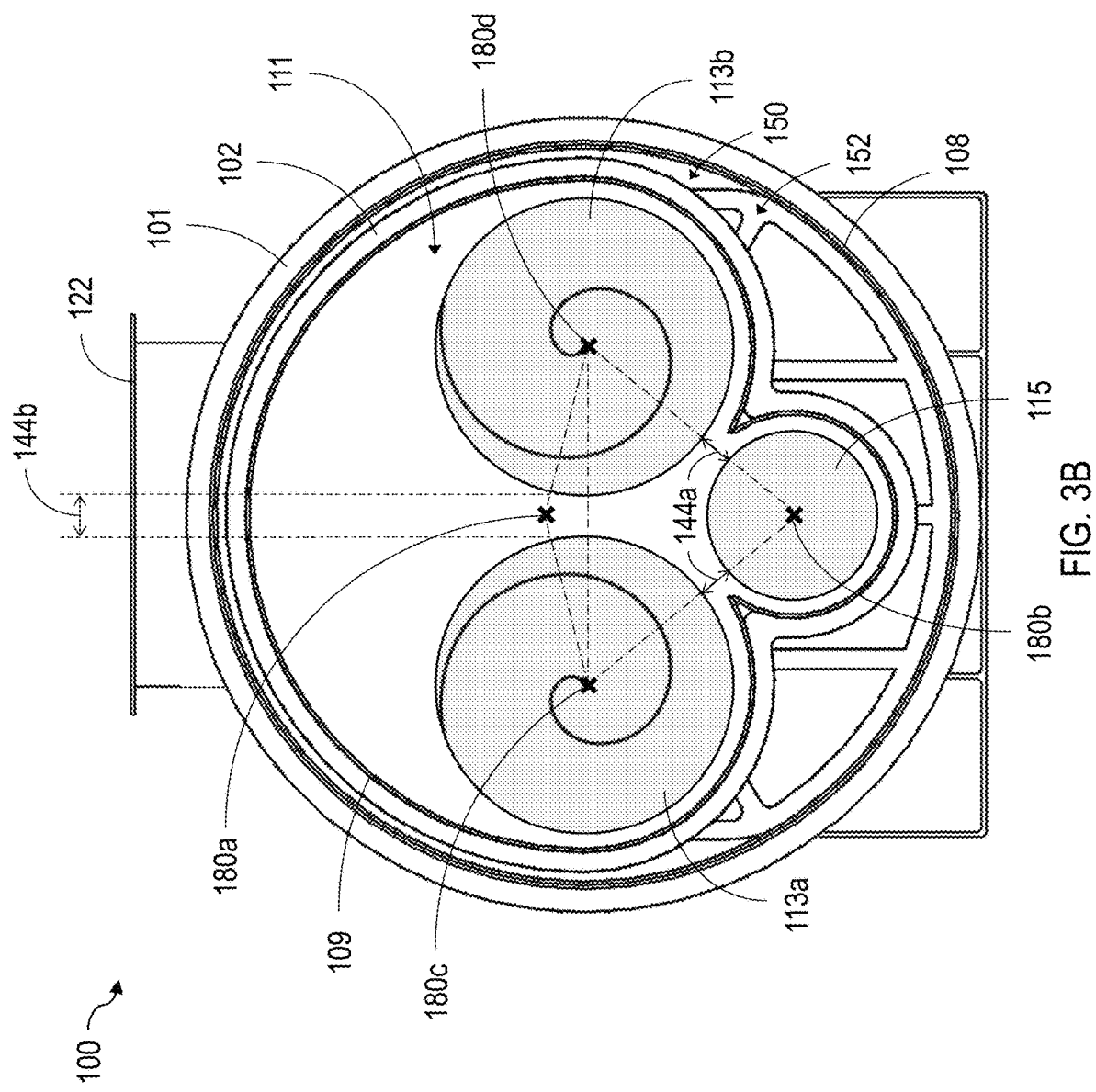
FIG. 3B is another cross-sectional view of the process vessel of FIG. 1A.

FIGS. 3A and 3B show the process vessel 100 in which the first outer end 123 is omitted from the view for the purpose of showing inner components of the process vessel 100. The process vessel 100 includes a first mixer 113*a*, a second mixer 113*b*, and an extruder element 115. As used herein, a "mixer" generally refers to a device suitable for mixing, agitating, or blending a composition, and "mix" generally refers to agitating materials, combining materials, or blending materials. That is, mixing does not necessarily result in a homogeneous mixture. As used herein, an "extruder element" generally refers to a device suitable for densifying or shaping a solid composition, "extruding" generally refers to densifying or shaping, and "extruded" generally refers to densified or shaped. The first mixer 113*a*, the second mixer 113*b*, and the extruder element 115 are disposed in the cavity 111 of the inner shell 102. In some embodiments, the process vessel can include one mixer, or multiple mixers (e.g., three, four, five, or more than five mixers). The extruder element 115 can be disposed adjacent to the second arcuate inner wall portion 140*b*. The extruder element 115 can be disposed within the channel 142. The first mixer 113*a* can be disposed adjacent to the third arcuate inner wall portion 140*c*, and the second mixer 113*a* can be disposed adjacent to the fourth arcuate inner wall portion 140*d*. The extruder element 115 can move into and out of the process vessel the outlet 124.

The extruder element 115 is a compression element configured to compress the solid waste mixture toward the opening, thereby forcing the solid waste mixture through the opening. For example, the compression element can include a mixer blade, a screw conveyer, a piston, a compression pump, or the like. The extruder element 115 circulates material (for example, a composition such as a solid waste mixture) within the cavity 111 of the inner shell 102 or transport material (such as a solid fuel composition) out of the process vessel 100 through the outlet 124. For example, when the extruder element 115 is rotating in a first direction, the extruder element 115 can transport a solid fuel composition out of the process vessel 100 through the outlet 124. When rotating in a second direction (for example, in a direction opposite the first direction), the extruder element 115 can circulate a composition in the cavity 111. The extruder element 115 can be an extrusion screw. The outlet 124 can optionally be heated to facilitate extrusion of the solid waste mixture out of the process vessel 100. For example, the outlet 124 can be operatively connected to an extrusion heater, such as an electrical heater, an inductive heater, or a convective heater.

The first mixer 113*a* is configured to rotate in a first direction, and the second mixer 113*b* is configured to rotate in a second direction opposite the first direction. For example, the first mixer 113*a* can rotate in a clockwise direction, and the second mixer 113*b* can rotate in a counterclockwise direction, or vice versa. Any known mixer design may be included in the process vessel 100 without limitation. The type and size of the mixers (113*a*, 113*b*) may be selected based on various factors, such as the ability to agitate the solid waste mixture (which can vary in density and viscosity), the ability to impart shear forces to the solid waste mixture, and energy requirements to drive the mixers 113a and 113b. The mixers 113a and 113b may include one or more mixer blades. The first mixer 113a and the second mixer 113b can be rotary mixing blades. When the process vessel 100 is horizontally oriented (that is, the lateral length of the first shell 101 is parallel to a horizontal, such as the ground or a platform), the mixers 113a and 113b can be laterally spaced in close proximity to one another to enable grinding of the solid waste mixture between the mixers (113a, 113b), which are counter-rotating. "Grinding" generally includes any form of reducing a material into smaller pieces, such as break apart or shear, and does not necessarily mean, for example, that the material is pulverized into a powder.

Still referring to FIGS. 3A and 3B, the extruder element 115 is spaced apart from each of the first mixer 113a and the second mixer 113b by a first gap 144a. The first mixer 113a and the second mixer 113b are spaced apart from each other by a second gap 144b. In some embodiments, the second gap 144b is larger than the first gap 144a. The longitudinal axis 180a of the inner shell 102 is a first longitudinal axis 180a. The extruder element 115 defines a second longitudinal axis 180b. The first mixer 113a defines a third longitudinal axis 180c. The second mixer 113b defines a fourth longitudinal axis 180d. The second longitudinal axis 180b, the third longitudinal axis 180c, and the fourth longitudinal axis 180d can each be offset from the first longitudinal axis 180a. In some embodiments, the first longitudinal axis 180a is equidistant from the third longitudinal axis 180c and the fourth longitudinal axis 180d. The first longitudinal axis 180a can be parallel to the second longitudinal axis 180b, the third longitudinal axis 180c, the fourth longitudinal axis 180d, or combinations of these. The second longitudinal axis 180b can be equidistant from the third longitudinal axis 180c and the fourth longitudinal axis 180d. The second longitudinal axis 180b, the third longitudinal axis 180c, and the fourth longitudinal axis 180d can form a triangular geometry in the cross section of the inner shell 102. The first longitudinal axis 180a, the second longitudinal axis 180b, the third longitudinal axis 180c, and the fourth longitudinal axis 180d can form a quadrilateral geometry in the cross section of the inner shell 102. The cross-sectional shape of the inner shell 102 can generally conform to the cross-sectional shapes of the first mixer 113a, second mixer 113b, and extruder element 115, so that the ratio between heated surface area (for example, the surface area of the heating jacket 109) and the volume of the inner cavity 111 can be increased in comparison to an inner shell with a cylindrical shape (that is, with a circular, cross-sectional shape). In some embodiments, the heated surface area is equal to the sum of the heated portions (that is, portions carrying heating fluid, such as the circulating heating oil) of the heating structure (e.g., heating jacket 109).

The "outer diameter" of a rotating component (for example, the first mixer 113a or the extruder element 115) generally refers to double the length of the longest radius of the component; the outer diameter is also equal to the diameter of the overall cross-sectional shape of the component going through a full, 360-degree rotation about its longitudinal axis. In some embodiments, an outer diameter of the first mixer 113a and an outer diameter of the second mixer 113b are equal. In some embodiments, a ratio of the outer diameter of the first mixer 113a to an outer diameter of the extruder element 115 is at least about 1:1 and at most about 3:1. For example, the outer diameters of the first mixer 113a and the second mixer 113b can be about 36 inches, and the outer diameter of the extruder element 115 can be about 20 inches, resulting in a ratio of 1.8:1 for the outer diameter of the first mixer 113a to the outer diameter of the extruder element 115.

In some embodiments, the cavity 111 is subdivided into separate drying and mixing chambers. The drying chamber and the mixing chamber can independently be surrounded by the heating jacket 109 to heat contents of either chamber. In some embodiments, a resealing door can be included in between the separate chambers, and the resealing door can be opened or otherwise moved to allow transfer of material between the drying chamber and the mixing chamber. In some embodiments, a partition can be included in between the separate chambers, and the partition can be moved to allow transfer of material between the drying chamber and the mixing chamber.

The process vessel 100 can include an exhaust port on the first shell wall 127 to provide an operative coupling to the pump (e.g., vacuum pump). In some embodiments, the pump is connected to the exhaust port with a hose (e.g., a vacuum hose), which may be reinforced to prevent collapse during use. The hose may also be heat-resistant or include insulation to allow safe operation at temperatures up to the maximum temperature to which the solid waste mixture is heated within the process vessel 100. The pump can be selected to maintain a sufficiently low pressure as described in this disclosure, within the cavity 111. The pump may be placed on a stand or a raised platform to prevent the pump from exposure to liquid water during incidental flooding. Any pump design may be included without limitation. For example, the pump can include a rotary vane pump, a diaphragm pump, or a liquid ring pump. The pump can optionally include one or more pumps connected in series.

In some embodiments, the pump includes a condenser operatively connected to the process vessel 100. The condenser cools water vapor and other vaporized compounds drawn from the cavity 111 by the pump to produce wastewater. The wastewater can be transferred to a wastewater reservoir, such as another vessel or a tank. A water treatment device operatively coupled to the wastewater reservoir can be configured to remove compounds from the condensed wastewater to produce treated wastewater. The water treatment device can include membrane filters, ozone chambers, activated carbon filters, or combinations thereof.

In some embodiments, the pump includes a gas scrubbing device, to which any air remaining in the condenser after the vaporized compounds have been condensed can pass through the pump and be exhausted. The gas exiting the pump (in other words, the exhaust) may include air, methane, chlorine, chlorinated organic compounds, and volatile organic compounds. The gas scrubbing device can include an adsorbent bed to separate methane and other combustible gases from the exhaust. The methane and other combustible gases captured by the adsorbent bed can be used as fuel, stored for later use, or be sold. The gas scrubbing device can include a gas filter, such as an activated carbon filter or a membrane filter. The gas remaining after treatment by the gas scrubbing device may be exhausted to the atmosphere.

The process vessel 100 includes an air source operatively coupled to the process vessel 100 through an air inlet port. The air source can introduce sweep air into the cavity 111 of the inner shell 102 to facilitate movement of vaporized compounds out of the cavity 111 and into the pump. The air source can provide air at a flow rate selected to maintain the desired pressure (e.g., vacuum) within the cavity 111 while the pump is operating. The air source may be any known air source, such as a compressed air tank, an air compressor, an air pump, or a fan drawing in atmospheric air. In some embodiments, the air source may supply an oxygen-free and non-reactive gas, such as nitrogen or a noble gas.

In some embodiments, the process vessel 100 includes a cutter configured to cut the solid waste mixture into discrete pieces, as the solid waste mixture is extruded out of the outer shell 101. For example, the cutter can be a laser cutter, a saw, or a water jet cutter. In some embodiments, the solid waste mixture is slightly cooled in order to harden the solid waste mixture prior to cutting. As an example, the solid waste mixture can be cut into discrete pieces that are less than about 2 feet in length.

Figure 4A:
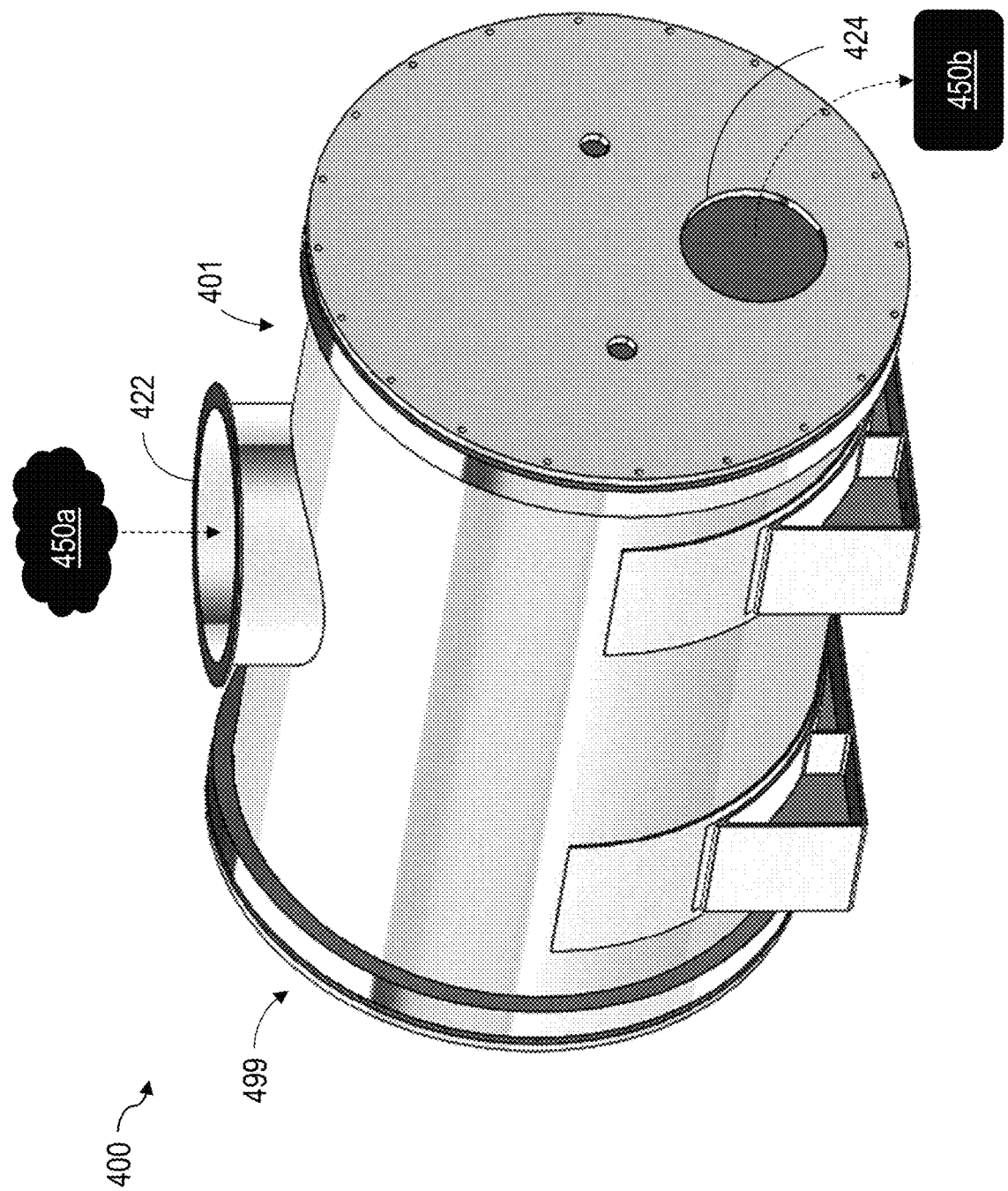
FIG. 4A is a perspective view of a system including the process vessel of FIG. 1A.
Figure 4B:
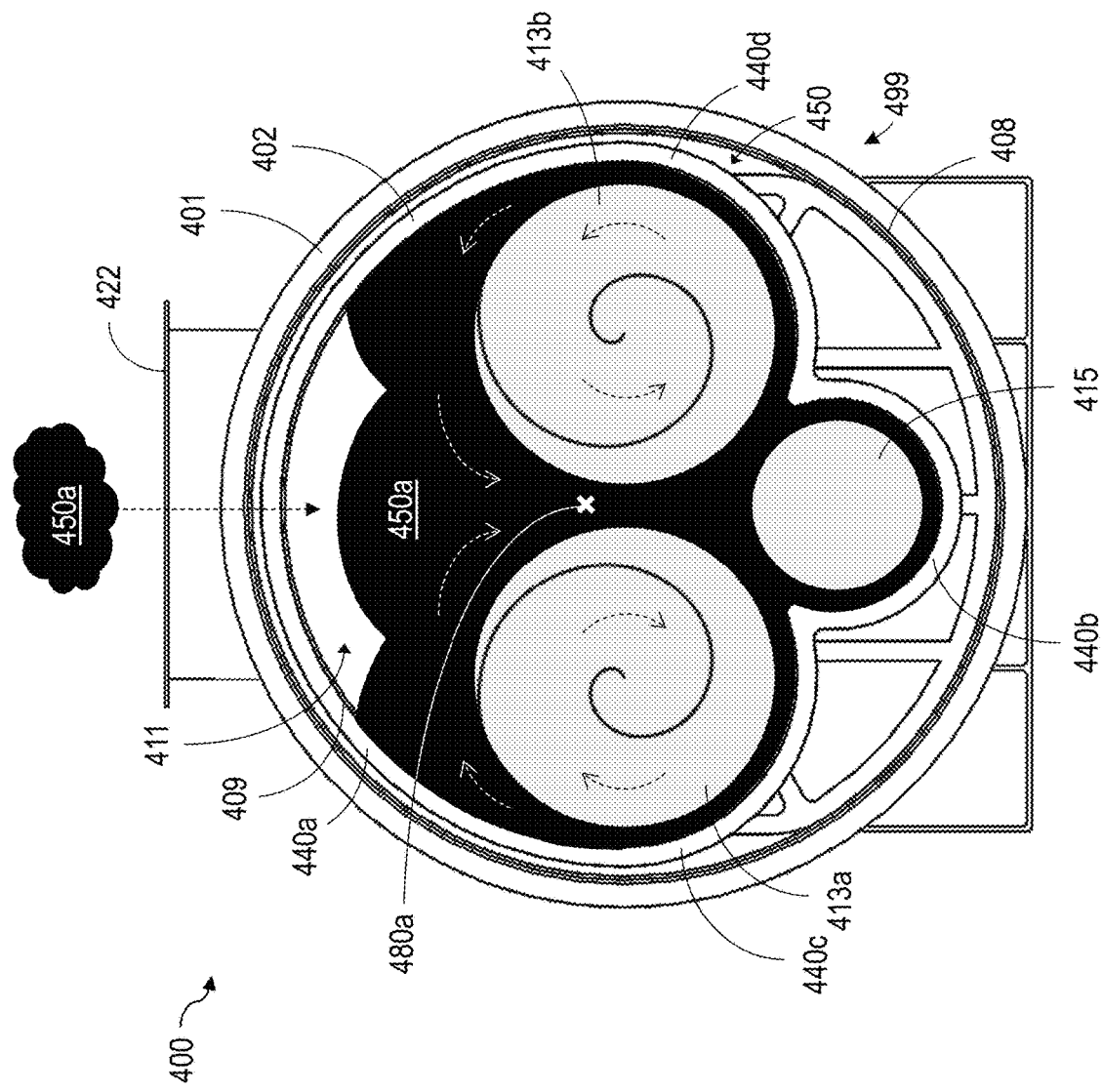
FIG. 4B is a cross-sectional view of the system of FIG. 4A.

FIGS. 4A and 4B show an exemplary system 400. The system 400 includes a composition 450a (e.g., feedstock material), such as a solid waste mixture. The system 400 includes a process vessel 499 that can be substantially the same as the process vessel 100 described earlier. The process vessel 499 can process the composition 450a and form a solid fuel composition 450b from the composition 450a. The solid fuel composition 450b includes an energy content of at least about 8,000 British thermal units per pound (BTU/lb).

The system 400 provided herein can be configured to process a composition 450a that includes solid waste. The solid waste can include solid, liquid, semi-solid, or contained gaseous material. In some embodiments, the solid waste is wet. In some embodiments, the solid waste is heterogeneous. In some embodiments, the solid waste includes non-combustible material. In some embodiments, the solid waste is material discarded from industrial, commercial, mining, agricultural, or community operations. The solid waste can include a mixture of solid waste having a variable composition due to the variable nature of municipal solid waste streams.

A variety of sources of solid waste can be used. The solid waste mixture may be derived from non-hazardous waste sources including, but not limited to, municipal waste, agricultural waste, commercial waste, household waste, mining waste, discarded secondary materials, industrial solid waste, and sewage sludge from a wastewater treatment plant, a water supply treatment plant, or an air pollution control facility. "Municipal waste" or "municipal solid waste" (MSW), as used here, generally refer to any household waste, commercial solid waste, or industrial solid waste. Non-limiting examples of wastes that can be included in the solid waste mixture include biodegradable waste, such as food and kitchen waste; green wastes, such as lawn or hedge trimmings; paper; mixed plastics; solid food waste; solid agricultural waste; sewage sludge; and automotive shredder residue. "Household waste" or "residential waste" generally refers to any solid waste (including garbage, trash, and sanitary waste in septic tanks) derived from households (including single and multiple residences, hotels and motels, bunkhouses, ranger stations, crew quarters, campgrounds, picnic grounds, and day-use recreation areas). "Commercial solid waste" generally refers to all types of solid waste generated by stores, offices, restaurants, warehouses, and other non-manufacturing activities. "Industrial solid waste" generally refers to non-hazardous solid waste generated by manufacturing or industrial processes. Examples of industrial solid waste include, but are not limited to, waste resulting from manufacturing processes, such as electric power generation; fertilizer and agricultural chemicals; food and related products and by-products; leather and leather products; organic chemicals; plastics and resins manufacturing; pulp and paper products; rubber and miscellaneous plastic products; textile manufacturing; transportation equipment; and water treatment.

The composition 450a can include solid waste containing water. For example, the solid waste can contain a variable amount of water ranging from about 10 wt % to about 60 wt %. In some embodiments, the solid waste contains an amount of water ranging from about 10 wt % to about 20 wt %, from about 10 wt % to about 30 wt %, 10 wt % to about 40 wt %, or 10 wt % to about 50 wt %. In some embodiments, the solid waste contains at least 10 wt % water, at least 20 wt % water, at least 30 wt % water, at least 40 wt % water, or at least 50 wt % water. In some embodiments, the solid waste contains less than 20 wt % water, less than 30 wt % water, less than 40 wt % water, less than 50 wt % water, or less than 60 wt % water. The amount of water in the solid waste can influence the time and/or temperature associated with removing the water from the solid waste during the formation of the solid fuel composition.

The composition 450a can include solid waste containing plastics. For example, in some embodiments, the solid waste includes at least about 20 wt % plastics. In some embodiments, the solid waste includes from about 20 wt % to about 60 wt % plastics. In some embodiments, the solid waste includes from about 20 wt % to about 40 wt % mixed plastics. In some embodiments, the feedstock for the process includes between about 5 wt % to about 35 wt % mixed plastics. In some embodiments, the feedstock for the process includes between about 5 wt % to about 30 wt % mixed plastics. In some embodiments, the feedstock for the process includes greater than about 5 wt % plastics, greater than about 10 wt % plastics, greater than about 15 wt % plastics, greater than about 20 wt % plastics, greater than about 25 wt % plastics, greater than about 30 wt % plastics, greater than about 35 wt % plastics, greater than about 40 wt % plastics, greater than about 45 wt % plastics, greater than about 50 wt % plastics, or greater than about 55 wt % plastics.

Still referring to FIGS. 4A and 4B, the process vessel 499 includes an inlet opening 422, an outlet opening 424, an outer shell 401, and an inner shell 402 disposed within the outer shell 401. The components of the process vessel 499 can be substantially the same as analogous components of the process vessel 100. For example, the inner shell 401 of the process vessel 499 is substantially the same as the inner shell 102 of the process vessel 100 (best shown in FIG. 1B).

The inner shell 401 includes a first end (e.g., the first end 103), a second end (e.g., the second end 105), and a wall (e.g., the wall 107) extending between the first end and the second end. The inner shell 401 defines a cavity 411 to hold the composition 450a during processing. The inner shell 401 defines a longitudinal axis 480a extending between the first end and the second end. A cross section of the inner shell 401 transverse to the longitudinal axis 180a includes a first arcuate inner wall portion 440a having a first radius of curvature and a second arcuate inner wall portion 440b having a second radius of curvature. The first radius of curvature is larger than the second radius of curvature (see analogous radii of curvature of process vessel 100).

The process vessel 499 includes an annular enclosure 450 defined between the outer shell 401 and the inner shell 402. The process vessel 499 can include a heating structure (e.g., the heating jacket 409 coupled to the wall of the inner shell 402), and the heating structure can heat the wall of the inner shell 402. The process vessel 499 can include an insulating material 408 disposed within the annular enclosure 450. The process vessel 499 can include a pump system operatively coupled to the outer shell 401 and the inner shell 402. The pump system can reduce the pressure or generate a vacuum within the cavity 411, the annular enclosure 450, or both. The pump system can set the cavity 411 at a first pressure and the annular enclosure 450 at a second pressure. The first pressure of the cavity 411 and the second pressure of the annular enclosure 450 can be equal. In some embodiments, a pressure differential between the first pressure of the cavity 411 and the second pressure of the annular enclosure 450 is no greater than 5 psi.

The cross section of the inner shell 402 transverse to the longitudinal axis 480a can include a third arcuate inner wall portion 440c and a fourth arcuate inner wall portion 440d. The process vessel 499 includes an extruder element 415, a first mixer 413a, and a second mixer 413b. The extruder element 415, the first mixer 413a, and the second mixer 413b can be disposed in the cavity 411 of the inner shell 402. The extruder element 415 can be disposed adjacent to the second arcuate inner wall portion 440b. The first mixer 413a can be disposed adjacent to the third arcuate inner wall portion 440c. The second mixer 413b can be disposed adjacent to the fourth arcuate inner wall portion 440d. The second arcuate inner wall portion 440b can form a channel, and the extruder element 415 can be disposed within the channel.

The first mixer 413a can rotate the composition 450a in a first direction, and the second mixer 413b can rotate the composition 450a in a second direction opposite the first direction. In other words, the first mixer 413a and the second mixer 413b can counter-rotate. The extruder element 415 can circulate the composition 450a in the cavity 411 or transport the solid fuel composition 450b out of the process vessel 499 through the outlet opening 424. For example, when the extruder element 415 rotates in a first direction, the extruder element 415 can transport the solid fuel composition 450b out of the process vessel 499 through the outlet opening 424. When the extruder element 415 rotates in a second direction (for example, opposite to the first direction), the extruder element 415 can circulate the composition 450a in the cavity 411.

The solid fuel composition 450b formed by the system 400 is provided herein. In some embodiments, the solid fuel composition 450b has a uniform consistency and reduced variability in energy content relative to the compositions used to produce the solid fuel composition. In some embodiments, the solid fuel composition 450b may have an energy content of at least 8,000 BTU/lb, at least 9,000 BTU/lb, at least 10,000 BTU/lb, at least 11,000 BTU/lb, at least 12,000 BTU/lb, at least 13,000 BTU/lb, at least 14,000 BTU/lb, or at least 15,000 BTU/lb In some embodiments, the solid fuel composition 450b has an energy content ranging from between about 8,000 BTU/lb to about 14,000 BTU/lb.

In some embodiments, the solid fuel composition 450b has a density ranging from about 30 lb/ft$^3$ to about 80 lb/ft$^3$. In some embodiments, the density of the solid fuel composition 450b is at least 30 lb/ft$^3$, at least 40 lb/ft$^3$, at least 50 lb/ft$^3$, at least 60 lb/ft$^3$, or at least 70 lb/ft$^3$. In some embodiments, the solid fuel composition 450b has a density of about 50 lb/ft$^3$.

The solid fuel composition 450b can include carbon. In some embodiments, the solid fuel composition 450b includes from about 40 wt % to about 80 wt % carbon. In some embodiments, the solid fuel composition 450b includes from about 40 wt % to about 44 wt %, from about 42 wt % to about 46 wt %, from about 44 wt % to about 48 wt %, from about 46 wt % to about 50 wt %, from about 48 wt % to about 52 wt %, from about 50 wt % to about 54 wt %, from about 52 wt % to about 56 wt %, from about 54 wt % to about 58 wt %, from about 56 wt % to about 62 wt %, from about 60 wt % to about 64 wt %, from about 62 wt % to about 66 wt %, from about 64 wt % to about 68 wt %, from about 66 wt % to about 70 wt %, from about 68 wt % to about 72 wt %, from about 70 wt % to about 74 wt %, from about 72 wt % to about 76 wt %, from about 74 wt % to about 78 wt %, and from about 76 wt % to about 80 wt % carbon.

The solid fuel composition 450b can include hydrogen. In some embodiments, the solid fuel composition 450b includes from about 5 wt % to about 20 wt % hydrogen. In some embodiments, the solid fuel composition 450b includes from about 5 wt % to about 7 wt % hydrogen, from about 6 wt % to about 8 wt % hydrogen, from about 7 wt % to about 9 wt % hydrogen, from about 8 wt % to about 10 wt % hydrogen, from about 9 wt % to about 11 wt % hydrogen, from about 10 wt % to about 12 wt % hydrogen, from about 11 wt % to about 13 wt % hydrogen, from about 12 wt % to about 14 wt % hydrogen, from about 13 wt % to about 15 wt % hydrogen, from about 14 wt % to about 16 wt % hydrogen, from about 15 wt % to about 17 wt % hydrogen, from about 16 wt % to about 18 wt % hydrogen, from about 17 wt % to about 19 wt % hydrogen, or from about 18 wt % to about 20 wt % hydrogen.

The solid fuel composition 450b can include oxygen. In some embodiments, the solid fuel composition 450b includes from about 5 wt % to about 20 wt % oxygen. In some embodiments, the solid fuel composition 450b includes from about 5 wt % to about 7 wt % oxygen, from about 6 wt % to about 8 wt % oxygen, from about 7 wt % to about 9 wt % oxygen, from about 8 wt % to about 10 wt % oxygen, from about 9 wt % to about 11 wt % oxygen, from about 10 wt % to about 12 wt % oxygen, from about 11 wt % to about 13 wt % oxygen, from about 12 wt % to about 14 wt % oxygen, from about 13 wt % to about 15 wt % oxygen, from about 14 wt % to about 16 wt % oxygen, from about 15 wt % to about 17 wt % oxygen, from about 16 wt % to about 18 wt % oxygen, from about 17 wt % to about 19 wt % oxygen, or from about 18 wt % to about 20 wt % oxygen.

The solid fuel composition 450b can include no sulfur, or minimal amounts of sulfur. In some embodiments, the solid fuel composition 450b includes less than about 2 wt % sulfur. In some embodiments, the solid fuel composition 450b includes less than about 1 wt % sulfur, less than about 0.5 wt % sulfur, or less than about 0.1 wt % sulfur.

The solid fuel composition 450b can include no chlorine, or minimal amounts of chlorine. The solid fuel composition 450b may include less than about 2 wt % chlorine. In some embodiments, the solid fuel composition 450b includes less than about 1 wt % chlorine, less than about 0.5 wt % chlorine, and less than about 0.1 wt % chlorine.

The solid fuel composition 450b can include no water, or minimal amounts of water. The solid fuel composition may include less than about 2 wt % water. In some embodiments, the solid fuel composition 450b includes less than about 1 wt % water, less than about 0.5 wt % water, and less than about 0.1 wt % water. In some embodiments, the solid fuel composition 450b includes less than about 1 wt % water.

The solid fuel composition 450b, when burned, may release significantly lower levels of toxins when burned compared to unprocessed compositions (e.g., unprocessed solid waste). The amount of toxins released can vary. For example, the solid fuel composition 450b can release less than about 0.5 lb alkali oxide, less than about 3 lb ash, less than about 0.1 lb sulfur dioxide ($SO_2$), and less than about 1.5 lb of chlorine per million BTU when burned. In some embodiments, the solid fuel composition 450b releases less than about 0.5 lb alkali oxide per million BTU when burned. In some embodiments, the solid fuel composition 450b releases less than about 3 lb ash per million BTU when burned. In some embodiments, the solid fuel composition 450b releases less than about 0.1 lb sulfur dioxide ($SO_2$) per million BTU when burned. In some embodiments, the solid fuel composition 450b releases less than about 1.5 lb of chlorine per million BTU when burned.

The solid fuel composition 450b may release an amount of ash ranging from between about 1 lb and about 30 lb per million BTU when burned, such as between about 1 lb and 2 lb, between about 2 lb and 3 lb, between about 3 lb and 4 lb, between about 4 lb and 5 lb, between about 5 lb and 10 lb, between about 10 lb and 15 lb, between about 15 lb and 20 lb, between about 20 lb and 25 lb, or between about 25 lb and 30 lb The solid fuel compositions may be used as an engineered feedstock to replace or supplement coal, biomass, or other alternative fuels during an incarnation, pyrolysis or gasification process.

Figure 5:
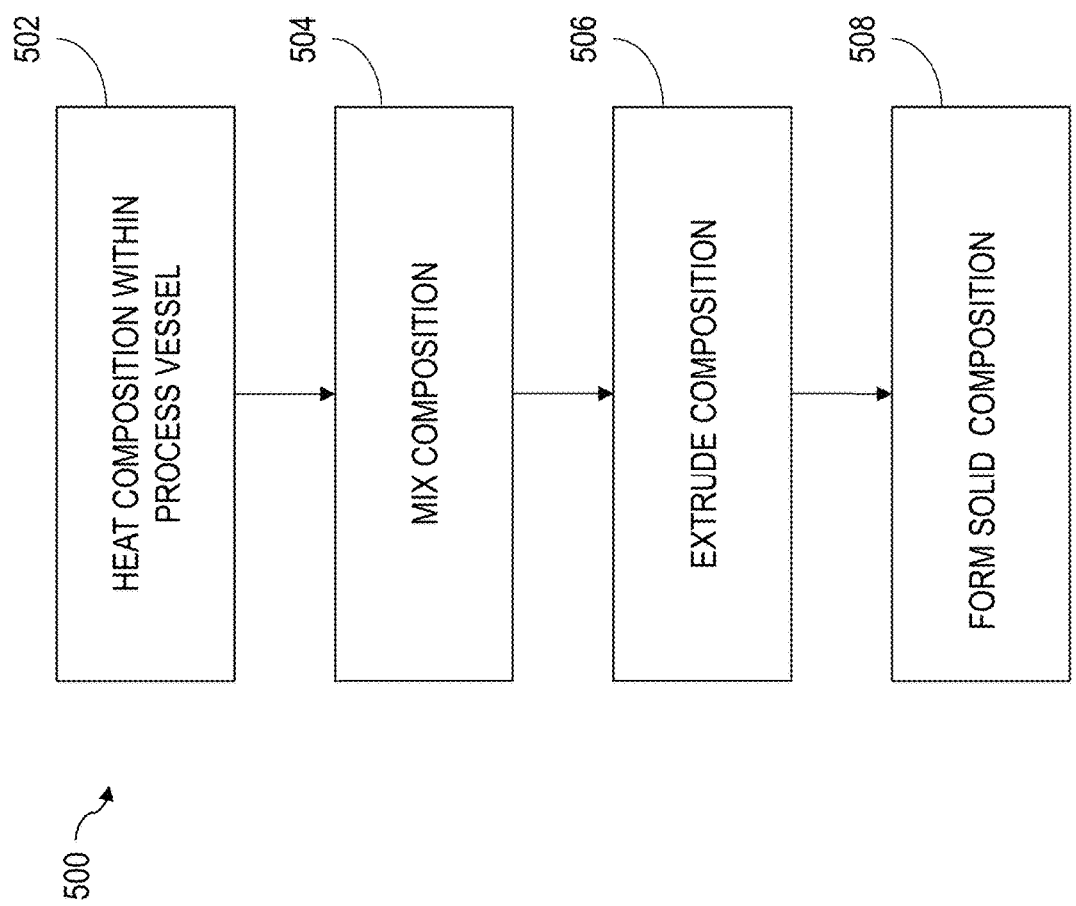
FIG. 5 is a flow chart of a method for forming a solid composition.

FIG. 5 depicts a flow chart of a method 500 for forming a solid composition (such as the solid fuel composition 450b) from a composition (such as the composition 450a). The composition 450a can be introduced into a process vessel, such as the process vessel 499. As one example, the composition 450a is a solid waste mixture and is introduced into the process vessel 499 from above, through the inlet opening 422. After introduction into the process vessel 499, at 502, the composition 450a is heated within the process vessel 499. The composition can be heated to a temperature of about 100 degrees Fahrenheit (° F.) using the heating structure (e.g., heating jacket 109). The heating step 502 can be categorized into three heating cycles: the first heating cycle includes increasing the temperature of the solid waste mixture 450a to the water evaporation temperature; the second heating cycle includes maintaining the temperature of the solid waste mixture 450a at the water evaporation temperature to remove water from the solid waste mixture 450a; and the third heating cycle includes increasing and maintaining the temperature of the solid waste mixture 450a to the extrusion temperature.

A vacuum can be pulled within the process vessel 499, such that a pressure within the cavity 411 is below atmospheric pressure. In some embodiments, the pressure within the process vessel 499 (and within the cavity 411) is maintained at about 50 torr. The vacuum not only reduces the boiling temperature of water and other compounds in the composition 450a, but also removes any of the vaporized compounds released by the heated solid waste. Reducing the boiling temperature of water and other compounds can reduce the necessary heating time and heating temperature to vaporize the compounds from the composition 450a. Reducing the heating time and heating temperature can reduce the necessary energy consumption to form the solid fuel composition 450b from the composition 450a. The vaporized compounds can include steam (that is, vaporized water). The vacuum can be generated by a vacuum pump or system connected to the outer shell 401 and the inner shell 402. Sweep air may be introduced into the process vessel 499 to facilitate movement of vaporized compounds out of the process vessel 499. The vacuum maintained within the process vessel 499 can also prevent combustion of material as the composition 250a is heated and dried. In some embodiments, the pressure within the process vessel 499 (that is, within the cavity 411 and the annular enclosure 450) is maintained to less than about 50 torr, 45 torr, 40 torr, 35 torr, 30 torr, 25 torr, 20 torr, 15 torr, 10 torr, or 5 torr. The range of pressures maintained within the process vessel 499 can vary. The pressure maintained within the process vessel 499 can vary between about 5 torr and about 100 torr, between about 40 torr and about 60 torr, between about 5 torr and about 10 torr, between about 10 torr and about 15 torr, between about 15 torr and about 20 torr, between about 20 torr and about 25 torr, between about 25 torr and about 30 torr, between about 30 torr and about 35 torr, between about 35 torr and about 40 torr, between about 40 torr and about 45 torr, between about 45 torr and about 50 torr, between about 50 torr and about 55 torr, between about 55 torr and about 60 torr, between about 60 torr and about 65 torr, between about 65 torr and about 70 torr, between about 70 torr and about 75 torr, between about 75 torr and about 80 torr, between about 80 torr and about 85 torr, between about 85 torr and about 90 torr, between about 90 torr and about 95 torr, and between about 95 torr and about 100 torr.

At 504, the composition 450a can be mixed with the first and second mixers (413a, 413b) disposed in the cavity 411 of the inner shell 402. As used herein, "mixed" generally refers to "agitated" or "blended." For example, the composition 450a can be mixed by rotating the first and second mixers (413a, 413b) in opposite directions. The composition 450a can be circulated within the process vessel 499 by rotating the extruder element 415 in a first direction.

The heating structure (e.g., heating jacket 409) can provide heat to the composition 450a and maintain a temperature within the process vessel 499 (and within the cavity 411) at about 100° F. In some embodiments, the heating structure provides heat to maintain a temperature within the process vessel 499 at about 400° F. The range of temperatures maintained within the process vessel 499 can vary. The temperature maintained within the process vessel 499 can vary between about 100° F. and about 400° F. In some embodiments, the temperature within the process vessel 499 is maintained at about 100° F. for a first duration and then at about 400° F. for a second duration. The maximum temperature and processing conditions within the process vessel 499 can be controlled, such that the composition 450a does not undergo pyrolysis.

The heating jacket 409 can be maintained at a temperature corresponding to a maximum temperature of the composition 450a, above which the composition 450a begins to undergo pyrolysis. The heating jacket 409 can be maintained at a temperature that is higher than the desired temperature of the composition 450a, so that the composition 450a can be heated up to its desired temperature more quickly. The heating jacket 409 can be maintained at a temperature that is higher than the desired temperature of the composition 450a in order to compensate for any potential heat losses. The heating jacket 409 can be maintained at a temperature that is about 10° F. hotter than the desired temperature of the composition 450a. For example, for a desired temperature of the composition 450a of 100° F., the heating jacket 409 can be maintained at a temperature of about 110° F. The heating jacket 409 can be maintained at a temperature that is about 200° F. hotter than the desired temperature of the composition 450a. For example, for a desired temperature of the composition 450a of 400° F., the heating jacket 409 can be maintained at a temperature of about 600° F. The desired temperature of the composition 450a can vary throughout the duration of heating (502) and mixing (504) of the composition 450a within the process vessel 499.

The composition 450a can be heated and mixed within the process vessel 499 for a duration ranging from about 10 minutes to about 120 minutes. In some embodiments, the composition 450b is formed within 60 minutes of heating (502) and mixing (504) the composition 450a within the process vessel 499. The duration of heating at 502 depends on various factors, such as the makeup of the composition 450a introduced into the process vessel 499, the temperature of the heating jacket 409, the specific heat capacities of the various components of the composition 450a, the mixing speed (that is, the rotational speed of the mixers 413a and 413b), and targeted specifications or characteristics of the fuel composition to be produced. The composition 450a may be heated (502) and mixed (504) for a duration ranging from about 10 minutes to about 120 minutes, about 15 minutes to about 25 minutes, from about 20 minutes to about 30 minutes, from about 25 minutes to about 35 minutes, from about 30 minutes to about 40 minutes, from about 35 minutes to about 45 minutes, from about 40 minutes to about 50 minutes, from about 45 minutes to about 55 minutes, from about 50 minutes to about 60 minutes, from about 55 minutes to about 65 minutes, from about 60 minutes to about 90 minutes, from about 75 minutes to about 105 minutes, and from about 90 minutes to about 120 minutes. The composition 450a may be heated and mixed within the process vessel 499 for a duration of about 40 minutes.

At 506, the composition 450a can be extruded from the process vessel 499 (for example, through the outlet 424) with the extruder element 415 disposed in the cavity 411 of the inner shell 402. As used herein, "extrude" generally refers to densify or shape. In some examples, the extruder element 415 can be a screw conveyer or an extrusion screw that may be operated in one direction to circulate the composition 450a within the cavity 411 and operated in a reverse direction to extrude the composition 450a out of the process vessel 499 through the outlet 424. In some examples, the extruder element can be any component or arrangement of components (e.g., an extruder with no diehead) configured to densify or shape the composition 450a.

At 508, a solid composition (such as the solid fuel composition 450b) is formed from the composition 450a. The solid fuel composition 450b has an energy content of at least 8,000 BTU/lb. The solid fuel composition 450b can be sterile, hydrophobic, chemically stable, non-biodegradable, or a combination of these. "Sterile" generally refers to the solid fuel composition 450b being substantially free of living microorganisms after being produced. "Stable" or "chemically stable" generally refers to the solid fuel composition 450b not substantially changing in chemical properties, physical properties, or structure upon extended contact with water, oxygen, ambient conditions, or ordinary storage conditions. The solid fuel composition 450b is stable until the solid fuel composition 450b is combusted, undergoes pyrolysis, or is employed as feedstock in a similar process. "Non-biodegradable" generally refers to the solid fuel composition 450b not degrading, deposing, or decomposing under ordinary biological action, such as rotting or composting. As a result, the solid fuel composition 450b can be stored for extended periods at a various storage conditions, used as feedstock to a collocated waste-to-energy facility, transported to a remote waste-to-energy facility, or used to provide energy for the process vessel 499 itself, any associated devices, or other processes.

The method 500 of forming a solid composition can be completed as a batch process, in which, for example, the solid waste mixture 450a is introduced to the process vessel 499, processed, and then extruded to form the solid fuel composition 450b. Once the solid fuel composition 450b has been completely extruded from the process vessel 499, another batch can be initiated. The method 500 can be completed as a semi-continuous process.

EXAMPLE

The following description applies to a non-limiting exemplary process vessel. The outer shell 401 of the process vessel 499 had an inside diameter in a range between 60 inches and 90 inches. The outer shell 401 had a length in a range between 90 inches and 126 inches. Each of the at least two mixing blades (the first mixer 413a and the second mixer 413b) had an outer diameter in a range between 30 inches and 42 inches. The extrusion screw (the extruder element 415) had an outer diameter in a range between 12 inches and 30 inches. The second arcuate inner wall portion 440b of the cross-sectional shape of the inner shell 402 had a central angle (with respect to the extruder element 415) in a range between 230° and 270°. The third and fourth arcuate inner wall portions (440c, 440d) of the cross-sectional shape of the inner shell 402 had central angles (with respect to the corresponding mixers, 413a and 413b) in a range between 100° and 140°.

The total inner volume of the process vessel 499 (that is, the volume within the outer shell 401) was in a range of 210 cubic feet ($ft^3$) and 230 $ft^3$ (5,947 liters (L) and 6,513 L). The working volume of the process vessel 499 (that is, the volume within which the solid waste mixture 450a is circulated, heated, and mixed, which is equal to the volume within the inner shell 402 excluding the volume taken up by the first mixer 413a, the second mixer 413b, and the extruder element 415 within the inner shell 402) was in a range of 185 $ft^3$ and 205 $ft^3$ (5,239 L and 5,805 L).

The total area of the cross-sectional shape of the inner shell 402 was in a range between 20 square feet ($ft^2$) and 30 $ft^2$. The heating jacket 409 lined the outer surface of the inner shell 402 and defined the heated surface area. The heated surface area was in a range between 180 $ft^2$ and 220 $ft^2$. The ratio between the heated surface area and the total surface area of the process vessel 499 was in a range between 0.5 and 0.9. The heating jacket 409 was supplied with hot oil (Duratherm 630') at a flow rate in a range between 130 gallons per minute (gpm) and 170 gpm and a temperature in a range between 600° F. and 650° F.

The process of forming the solid fuel composition 450b from the solid waste mixture 450a was completed as a batch process, in which the solid waste mixture 450a was introduced to the process vessel 499, processed, and then extruded to form the solid fuel composition 450b. Once the solid fuel composition 450b was completely extruded from the process vessel 499, another batch was initiated. The process was categorized into three heating cycles: the first heating cycle which included increasing the temperature of the solid waste mixture 450a to the water evaporation temperature; the second heating cycle which included maintaining the temperature of the solid waste mixture 450a at the water evaporation temperature to remove water from the solid waste mixture 450a; and the third heating cycle which included increasing and maintaining the temperature of the solid waste mixture 450a to the extrusion temperature. The total process took 30 minutes to 60 minutes to complete. The mass of total solid fuel composition 450b formed in a single batch was in a range between 80% and 99% of the total original mass of the solid waste mixture 450a introduced to the process vessel 499 (includes moisture content).

Other Embodiments

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A vessel comprising:
a first shell;
a second shell disposed within the first shell, the second shell comprising a first end, a second end, and a wall extending from the first end to the second end, the second shell defining a cavity, the second shell further defining a primary longitudinal axis extending between the first end and the second end, the second shell having a cross section that is transverse to the primary longitudinal axis, the cross section including first, second, third, and fourth arcuate inner wall portions, the second arcuate inner wall portion forming a channel between the third arcuate inner wall portion and the fourth arcuate inner wall portion;
a first mixer disposed in the cavity;
a second mixer disposed in the cavity; and
an extruder element disposed in the channel in the cavity.

2. The vessel of claim 1, wherein the first mixer and the second mixer each comprise a rotary mixing blade.

3. The vessel of claim 1, wherein the extruder element is an extrusion screw.

4. The vessel of claim 1, wherein the first arcuate inner wall portion has a first radius of curvature and the second arcuate inner wall portion has a second radius of curvature that is larger than the first radius of curvature.

5. The vessel of claim 1, wherein an annular enclosure is defined between the first shell and the second shell.

6. The vessel of claim 5, further comprising a support structure disposed in the annular enclosure, wherein portions of the support structure extend transverse to the primary longitudinal axis and extending circumferentially about a portion of an exterior surface of the second shell.

7. The vessel of claim 5, further comprising a pump operatively coupled to the first and second shells, wherein the pump is configured to reduce a pressure within the cavity, the annular enclosure, or both.

8. The vessel of claim 5, wherein the vessel is configured so that, during use of a pump, the cavity has a first pressure and the annular enclosure has a second pressure, and the first and second pressures are within a 10% deviation.

9. The vessel of claim 5, wherein the cavity has a first pressure and the annular enclosure has a second pressure, wherein a pressure differential between the first and second pressures is no greater than 5 pounds per square inch.

10. The vessel of claim 1, wherein the third arcuate inner wall portion has a third radius of curvature, and the fourth arcuate inner wall portion has a fourth radius of curvature that is identical to the third radius of curvature.

11. The vessel of claim 1, wherein the third arcuate inner wall portion and the fourth arcuate inner wall portion each have a radius of curvature that is larger than a radius of curvature of the second arcuate inner wall portion.

12. The vessel of claim 11, wherein the third arcuate inner wall portion and the fourth arcuate inner wall portion each have a radius of curvature that is smaller than a radius of curvature of the first arcuate inner wall portion.

13. The vessel of claim 1, wherein the extruder element extends defines a second longitudinal axis that extends along a length of the vessel, the first mixer defines a third longitudinal axis that extends along the length of the vessel, and the second mixer defines a fourth longitudinal axis that extends along the length of the vessel.

14. The vessel of claim 13, wherein the second, third, and fourth longitudinal axes form a triangular geometry in the cross section of the second shell.

15. The vessel of claim 13, wherein the primary longitudinal axis is parallel to the second longitudinal axis, the third longitudinal axis, the fourth longitudinal axis, or combinations thereof.

16. The vessel of claim 13, wherein the second longitudinal axis is equidistant from the third longitudinal axis and the fourth longitudinal axis.

17. The vessel of claim 1, wherein the extruder element is disposed adjacent to the second arcuate inner wall portion, the first mixer is disposed adjacent to the third arcuate inner wall portion, and the second mixer is disposed adjacent to the fourth arcuate inner wall portion.

18. The vessel of claim 1, wherein the extruder element is spaced apart from each of the first mixer and the second mixer by a first gap, and the first mixer and the second mixer can be spaced apart from each other by a second gap, wherein the second gap is larger than the first gap.

19. The vessel of claim 18, wherein the extruder element is configured to, when the extruder element is rotating in a first direction, transport a solid fuel composition out of the vessel through an outlet opening.

* * * * *